(12) United States Patent
Takagi et al.

(10) Patent No.: US 10,248,071 B2
(45) Date of Patent: Apr. 2, 2019

(54) DRIVE TRANSMITTER AND IMAGE FORMING APPARATUS INCORPORATING THE DRIVE TRANSMITTER

(71) Applicants: Hiroaki Takagi, Kanagawa (JP); Junichi Ichikawa, Kanagawa (JP)

(72) Inventors: Hiroaki Takagi, Kanagawa (JP); Junichi Ichikawa, Kanagawa (JP)

(73) Assignee: RICOH COMPANY, LTD., Tokyo (JP)

( * ) Notice: Subject to any disclaimer, the term of this patent is extended or adjusted under 35 U.S.C. 154(b) by 588 days.

(21) Appl. No.: 14/835,803

(22) Filed: Aug. 26, 2015

(65) Prior Publication Data

US 2016/0062300 A1    Mar. 3, 2016

(30) Foreign Application Priority Data

Aug. 27, 2014   (JP) .................................. 2014-172889
Jun. 11, 2015   (JP) .................................. 2015-118247

(51) Int. Cl.
*F16D 1/10*   (2006.01)
*F16D 3/06*   (2006.01)
(Continued)

(52) U.S. Cl.
CPC ............. *G03G 15/757* (2013.01); *F16D 1/10* (2013.01); *F16D 3/06* (2013.01); *G03G 15/75* (2013.01);
(Continued)

(58) Field of Classification Search
CPC . F16D 1/10; F16D 1/101; F16D 1/108; F16D 3/06; F16D 3/20; F16D 2001/102;
(Continued)

(56) References Cited

U.S. PATENT DOCUMENTS 4,938,731 A * 7/1990 Nguyen ............... B25B 13/065
                                                    403/14
6,385,418 B1 * 5/2002 Fukuchi .................. F16D 1/112
                                                    399/167
(Continued)

FOREIGN PATENT DOCUMENTS

CN   102478777 A   5/2012
EP   2259156 A2   12/2010
(Continued)

OTHER PUBLICATIONS

Translation of JP 2010-106859. Kawaguchi, Daisuke. Drive Transmitting Device and Image Forming Device. May 13, 2010.*
(Continued)

*Primary Examiner* — Josh Skroupa
(74) *Attorney, Agent, or Firm* — Harness, Dickey & Pierce, P.L.C.

(57) ABSTRACT

A drive transmitter that is applicable to an image forming apparatus includes a first coupler, a second coupler, and reinforcing ribs. The first coupler is mounted on an axial end of a first rotary shaft and is provided with extensions. The extensions extend in an axial direction of the first coupler and are arranged at intervals in a rotation direction thereof. The second coupler is mounted on an axial end of a second rotary shaft and is provided with contact parts to which the respective extensions contact between the first rotary shaft and the second rotary shaft upon drive transmission. The reinforcing ribs are provided to the respective extensions and reinforce the respective extensions.

20 Claims, 20 Drawing Sheets

(51) Int. Cl.
*G03G 15/00* (2006.01)
*G03G 21/16* (2006.01)
*G03G 21/18* (2006.01)

(52) U.S. Cl.
CPC ....... *G03G 21/1647* (2013.01); *G03G 21/186* (2013.01); *G03G 2221/1657* (2013.01); *Y10T 403/7032* (2015.01)

(58) Field of Classification Search
CPC .............. F16D 2001/103; G03G 15/75; G03G 15/757; G03G 21/1647; G03G 21/186; G03G 2221/1657; Y10T 403/32483; Y10T 403/599; Y10T 403/7032
USPC .............. 464/158–160, 169; 403/109.3, 325, 403/359.4
See application file for complete search history.

(56) References Cited

U.S. PATENT DOCUMENTS

| | | | | |
|---|---|---|---|---|
| 6,400,914 | B1* | 6/2002 | Noda | F16D 1/101 399/111 |
| 6,892,042 | B2* | 5/2005 | Jang | F16D 1/101 399/120 |
| D522,821 | S* | 6/2006 | Hsieh | D8/29 |
| 7,561,826 | B2* | 7/2009 | Takigawa | G03G 15/757 399/111 |
| 7,813,676 | B2* | 10/2010 | Huck | F16D 1/101 399/167 |
| 8,628,269 | B2* | 1/2014 | Fan | F16D 1/101 399/167 |
| 8,737,882 | B2* | 5/2014 | Peng | F16D 1/108 399/117 |
| 8,805,242 | B2* | 8/2014 | Zhao | G03G 21/186 399/167 |
| 9,063,506 | B2* | 6/2015 | Lewis | G03G 15/757 |
| 2006/0268081 | A1 | 11/2006 | Sugata | |
| 2009/0010681 | A1 | 1/2009 | Huck et al. | |
| 2009/0196655 | A1 | 8/2009 | Takigawa et al. | |
| 2010/0232819 | A1 | 9/2010 | Kudo et al. | |
| 2011/0249988 | A1* | 10/2011 | Miura | G03G 15/757 399/167 |
| 2012/0134716 | A1 | 5/2012 | Maeshima | |
| 2012/0190489 | A1 | 7/2012 | Takagi | |
| 2013/0287488 | A1* | 10/2013 | Iijima | G03G 21/186 403/348 |

FOREIGN PATENT DOCUMENTS

| | | |
|---|---|---|
| EP | 2703893 A1 | 3/2014 |
| GB | 2214609 A | 9/1989 |
| JP | H04-014057 A | 1/1992 |
| JP | 7-139557 | 5/1995 |
| JP | 11-338211 | 12/1999 |
| JP | 2001-032902 A | 2/2001 |
| JP | 2002-235763 | 8/2002 |
| JP | 2003-287050 A | 10/2003 |
| JP | 2004-045603 | 2/2004 |
| JP | 2006-226310 A | 8/2006 |
| JP | 2008-033175 A | 2/2008 |
| JP | 2008-309871 | 12/2008 |
| JP | 2008-309872 A | 12/2008 |
| JP | 2009-104101 | 5/2009 |
| JP | 2010-106859 | 5/2010 |
| JP | 2012-133307 A | 7/2012 |
| JP | 2014-020537 | 2/2014 |
| JP | 2014-052618 | 3/2014 |

OTHER PUBLICATIONS

Office Action for Corresponding Chinese Patent Application No. 201510530917.7 dated Jul. 9, 2018.
Office Action for Corresponding Japanese Patent Application No. 2015-118247 dated Nov. 9, 2018.

\* cited by examiner

DRIVE TRANSMITTER AND IMAGE FORMING APPARATUS INCORPORATING THE DRIVE TRANSMITTER

CROSS-REFERENCE TO RELATED APPLICATIONS

This patent application is based on and claims priority pursuant to 35 U.S.C. § 119(a) to Japanese Patent Application Nos. 2014-172889, filed on Aug. 27, 2014, and 2015-118247, filed on Jun. 11, 2015, in the Japan Patent Office, the entire disclosure of each of which is hereby incorporated by reference herein.

BACKGROUND

Technical Field

This disclosure relates to a drive transmitter, and an image forming apparatus including the drive transmitter.

Related Art

Electrophotographic type image forming apparatuses include rotary bodies such as a photoconductor and a developing roller, and form an image by rotating the rotary bodies. Many of the rotary bodies are replaceable by removing from an apparatus body of an image forming apparatus. For this configuration, a drive transmitter that transmits a drive force from a drive source of the apparatus body to the rotary body is provided with a coupling that detachably connects the drive source and the rotary body.

As an example, there is a coupling that functions as a drive transmitter and includes an output-side engaging member and an input-side engaging member. The output-side engaging member functions as a first coupler provided at an end of a drive shaft that functions as a first rotary shaft. The input-side engaging member functions as a second coupler provided at an end of a sleeve shaft that functions as a second rotary shaft. The output-side engaging member has output-side engagement projections functioning as extensions extending in the axial direction. The input-side engaging member has input-side engagement projections that contact the output-side engagement projections of the output-side engaging member. The input-side engagement projections extends in the direction of the normal to the sleeve shaft and includes contact parts to which the output-side engagement projections contact.

SUMMARY

At least one aspect of this disclosure provides a drive transmitter including a first coupler, a second coupler, and reinforcing ribs. The first coupler is mounted on an axial end of a first rotary shaft and provided with extensions. The extensions extend in an axial direction of the first coupler and are arranged at intervals in a rotation direction thereof. The second coupler is mounted on an axial end of a second rotary shaft and is provided with contact parts to which the respective extensions contact between the first rotary shaft and the second rotary shaft upon drive transmission. The reinforcing ribs are provided to the respective extensions and reinforcing the respective extensions.

Further, at least one aspect of this disclosure provides an image forming apparatus including an image forming device to form an image on a recording medium, and the above-described drive transmitter to transmit a drive force to the image forming device.

DETAILED DESCRIPTION

Figure 1:
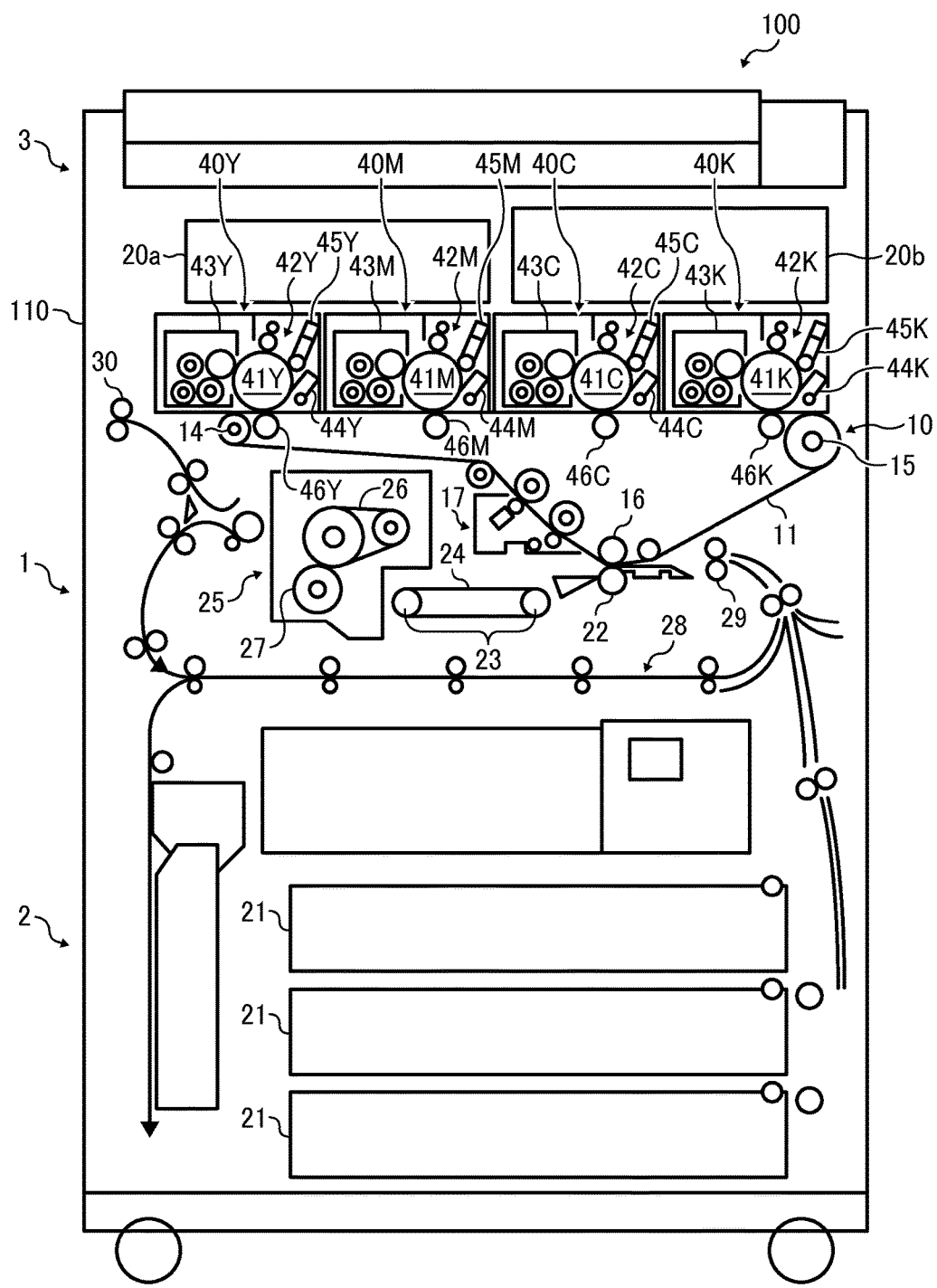
FIG. 1 is a schematic configuration diagram illustrating an image forming apparatus according to an example of this disclosure.

It will be understood that if an element or layer is referred to as being "on", "against", "connected to" or "coupled to" another element or layer, then it can be directly on, against, connected or coupled to the other element or layer, or intervening elements or layers may be present. In contrast, if an element is referred to as being "directly on", "directly connected to" or "directly coupled to" another element or layer, then there are no intervening elements or layers present. Like numbers referred to like elements throughout. As used herein, the term "and/or" includes any and all combinations of one or more of the associated listed items.

Spatially relative terms, such as "beneath", "below", "lower", "above", "upper" and the like may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements describes as "below" or "beneath" other elements or features would then be oriented "above" the other elements or features. Thus, term such as "below" can encompass both an orientation of above and below. The device may be otherwise oriented (rotated 90 degrees or at other orientations) and the spatially relative descriptors herein interpreted accordingly.

Although the terms first, second, etc. may be used herein to describe various elements, components, regions, layers and/or sections, it should be understood that these elements, components, regions, layer and/or sections should not be limited by these terms. These terms are used to distinguish one element, component, region, layer or section from another region, layer or section. Thus, a first element, component, region, layer or section discussed below could be termed a second element, component, region, layer or section without departing from the teachings of the present disclosure.

The terminology used herein is for describing particular embodiments and examples and is not intended to be limiting of exemplary embodiments of this disclosure. As used herein, the singular forms "a", "an" and "the" are intended to include the plural forms as well, unless the context clearly indicates otherwise. It will be further understood that the terms "includes" and/or "including", when used in this specification, specify the presence of stated features, integers, steps, operations, elements, and/or components, but do not preclude the presence or addition of one or more other features, integers, steps, operations, elements, components, and/or groups thereof.

Descriptions are given, with reference to the accompanying drawings, of examples, exemplary embodiments, modification of exemplary embodiments, etc., of an image forming apparatus according to exemplary embodiments of this disclosure. Elements having the same functions and shapes are denoted by the same reference numerals throughout the specification and redundant descriptions are omitted. Elements that do not demand descriptions may be omitted from the drawings as a matter of convenience. Reference numerals of elements extracted from the patent publications are in parentheses so as to be distinguished from those of exemplary embodiments of this disclosure.

This disclosure is applicable to any image forming apparatus, and is implemented in the most effective manner in an electrophotographic image forming apparatus.

In describing preferred embodiments illustrated in the drawings, specific terminology is employed for the sake of clarity. However, the disclosure of this disclosure is not intended to be limited to the specific terminology so selected and it is to be understood that each specific element includes any and all technical equivalents that have the same function, operate in a similar manner, and achieve a similar result.

Referring now to the drawings, wherein like reference numerals designate identical or corresponding parts throughout the several views, preferred embodiments of this disclosure are described.

Now, a description is given of an image forming apparatus 100 according to an example of this disclosure.

A description is given hereinafter of embodiments where this disclosure is applied to an image forming apparatus 100, for example a copier in the following examples. The outline of the image forming apparatus is described first with reference to FIG. 1. The image forming apparatus 100 has the function as what is called a digital color copier that digitizes image information obtained by scanning and reading an original, and uses the image information to form an image. Moreover, the copier also has the function of a facsimile machine that sends/receives image data of an original document to/front a remote place, and the function of what is called a printer that prints, on a paper sheet, image information handled by a computer.

FIG. 1 is a diagram illustrating an image forming apparatus 100 according to an example of this disclosure.

The image forming apparatus 100 may be a copier, a printer, a scanner, a facsimile machine, a plotter, and a multifunction peripheral device or a multifunction printer (MFP) having at least one of copying, printing, scanning, facsimile, and plotter functions, or the like. According to the present example, the image forming apparatus 100 is an electrophotographic printer that forms toner images on a sheet or sheets by electrophotography.

Further, this disclosure is also applicable to image forming apparatuses adapted to form images through other schemes, such as known ink jet schemes, known toner projection schemes, or the like as well as to image forming apparatuses adapted to form images through electro-photographic schemes.

It is also to be noted in the following examples that: the term "image forming apparatus" indicates an apparatus in which an image is formed on a recording medium such as paper, OHP (overhead projector) transparencies, OHP film sheets, thread, fiber, fabric, leather, metal, plastic, glass, wood, and/or ceramic by attracting developer or ink thereto; the term "image formation" indicates an action for providing (i.e., printing) not only an image having meanings such as texts and figures on a recording medium but also an image having no meaning such as patterns on a recording medium; and the term "sheet" is not limited to indicate a paper material but also includes the above-described plastic material (e.g., a OHP sheet), a fabric sheet and so forth, and is used to which the developer or ink is attracted. In addition, the "sheet" is not limited to a flexible sheet but is applicable to a rigid plate-shaped sheet and a relatively thick sheet.

In FIG. 1, the image forming apparatus 100 forms an image on a recording sheet in an intermediate transfer system using an intermediate transfer belt 11, and is a tandem system electrophotographic apparatus that forms a toner image of each color with its dedicated process cartridge. A multistage sheet feeder 2 is provided in the lowermost part of the copier in the vertical direction. Moreover, an image forming unit 1 is provided above the sheet feeder 2, and a scanner 3 is provided further above the image forming unit 1. Sheet feed trays 21 store bundles of sheets including plain paper that functions as a recording medium, and recording sheets such as OHP sheets and duplicate originals are respectively arranged in the stages of the sheet feeder 2.

A transfer device 10 is arranged substantially in the middle of the image forming unit 1. In the transfer device 10, multiple rollers are arranged inside a loop of an endless intermediate transfer belt 11 to stretch the endless intermediate transfer belt 11 therearound. The intermediate transfer belt 11 rotates (its surface moves) in a clockwise direction in FIG. 1. Four process cartridges 40Y, 40M, 40C, and 40K for forming toner images in yellow, magenta, cyan, and black are arranged above the intermediate transfer belt 11 along a surface movement direction of the intermediate transfer belt 11. Since the configurations of the four process cartridges 40Y, 40M, 40C, and 40K, each functioning as an image forming device, are identical to each other except for the color of toner, the suffixes "Y", "M", "C", and "K" indicating respective colors are omitted below as appropriate. Moreover, two optical writing units 20a and 20b as latent image writing means are provided above the four process cartridges 40Y, 40M, 40C, and 40K.

Figure 2:
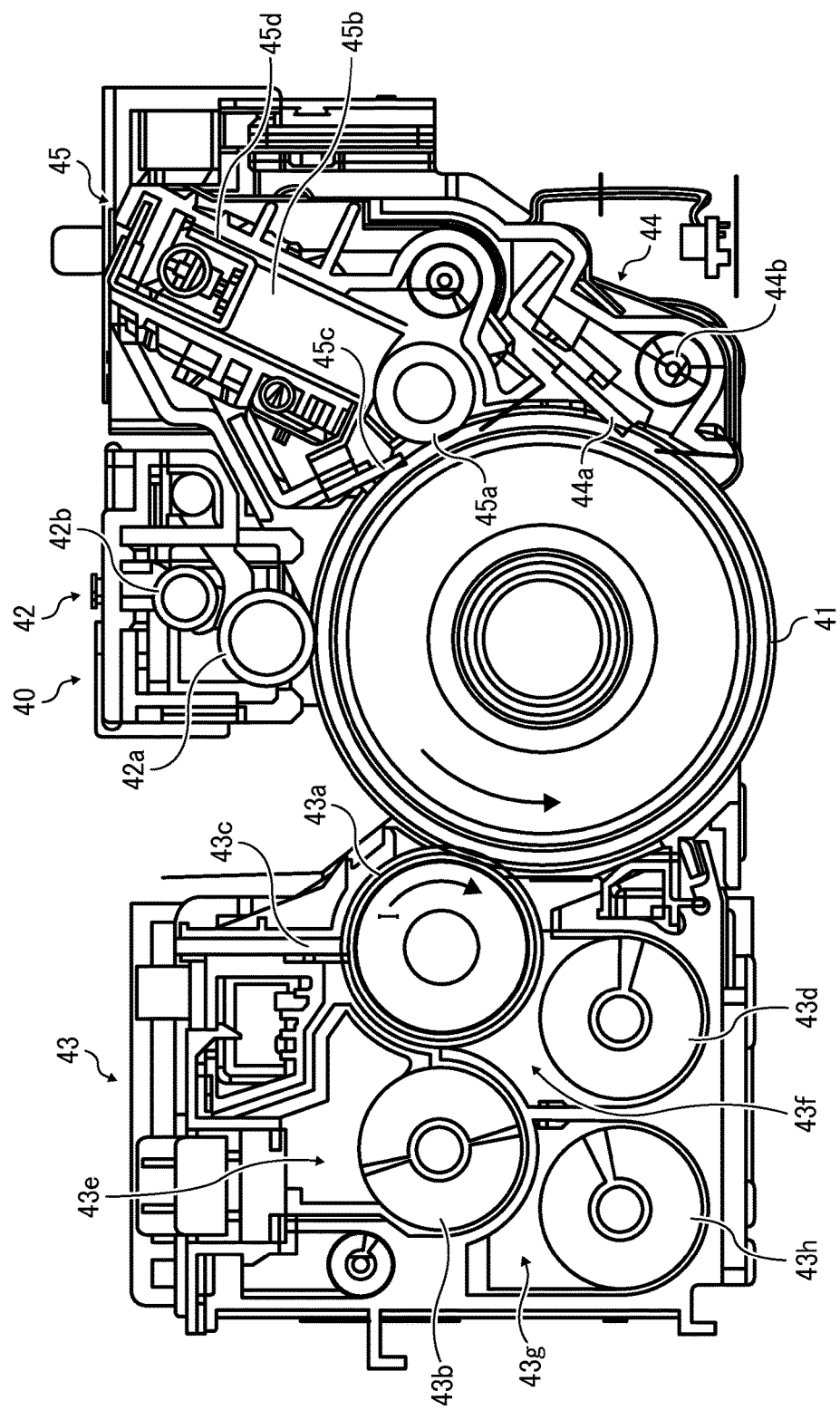
FIG. 2 is an enlarged view of a configuration of a process cartridge of the image forming apparatus according to an example of this disclosure.

FIG. 2 is an enlarged view of a configuration of one of the four process cartridges 40Y, 40M, 40C, and 40K of the image forming apparatus 100 according to an example of this disclosure.

Each process cartridge 40 is provided with a drum-shaped photoconductor 41 as a latent image bearer. Each photoconductor 41 is rotatably provided in a counterclockwise direction in FIG. 2. A charging device 42, a developing device 43, a photoconductor cleaning device 44, and a lubricant coating device 45 are provided around the photoconductor 41.

The charging device 42 mainly includes a charging roller 42a and a charging roller cleaner 42b. The charging roller 42a is arranged to contact the photoconductor 41. The charging roller cleaner 42b rotates in contact with the charging roller 42a. A charge bias is applied to the charging roller 42a to give electrical charge to the surface of the photoconductor 41, so that the surface of the photoconductor 41 is uniformly charged. The charging roller cleaner 42b removes adhered substances or foreign materials such as the toner adhered to the surface of the charging roller 42a.

The developing device 43 includes a developing roller 43a and a supply screw 43b. The developing roller 43a functions as a developer bearer to supply the toner to a latent image on the surface of the photoconductor 41 while moving the surface of the developing device 43 in a direction indicated by arrow I in FIG. 2, and develops the latent image. The supply screw 43b functions as a supply and transport member to transport a developer from the far side to the near side in a direction orthogonal to the space of FIG. 2 while supplying the developer to the developing roller 43a. The supply screw 43b includes a rotating shaft and a blade provided to the rotating shaft. The supply screw 43b transports the developer in the axial direction by its rotation.

The developing device 43 further includes a developing doctor 43c, a collection screw 43d, a supply conveyance path 43e, a collection conveyance path 43f, a stirring conveyance path 43g, and a stirring screw 43h.

The developing doctor 43c is provided downstream of a facing portion between the developing roller 43a and the supply screw 43b in the developing roller surface movement direction. The developing doctor 43c functions as a developer controller to regulate the developer on the developing roller 43a to a thickness suitable for development.

The collection screw 43d is provided downstream from the development area in a moving direction of the surface of the developing roller 43a. The collection screw 43d collects the developed developer that has passed a development area, which is a facing area between the developing roller 43a and the photoconductor 41, and transports the collected developer collected from the developing roller 43a in the same direction as the supply screw 43b.

The supply conveyance path 43e that accommodates the supply screw 43b is arranged on the side of the developing roller 43a.

The collection conveyance path 43f is arranged in parallel below the developing roller 43a. The collection conveyance path 43f functions as a developer collection conveyance path to accommodate the collection screw 43d.

The stirring conveyance path 43g stirs and transports the developer in a direction parallel with the collection conveyance path 43f below the supply conveyance path 43e. The stirring conveyance path 43g includes the stirring screw 43h that transports the developer toward the far side in FIG. 2, which is an opposite direction to the supply screw 43b while stirring the developer.

The supply conveyance path 43e and the stirring conveyance path 43g are partitioned by a first partition wall. A partitioning part of the first partition wall between the supply conveyance path 43e and the stirring conveyance path 43g has an opening at both ends on the near side and the far side of FIG. 2. The supply conveyance path 43e communicates with the stirring conveyance path 43g. It is to be noted that, even though both the supply conveyance path 43e and the collection conveyance path 43f are partitioned by the first partition wall, a partitioning part of the first partition wall between the supply conveyance path 43e and the collection conveyance path 43f is not provided with an opening. Moreover, two conveyance paths, which are the stirring conveyance path 43g and the collection conveyance path 43f, are partitioned by a second partition wall. The second partition wall has an opening on the near side of FIG. 2. The stirring conveyance path 43g communicates with the collection conveyance path 43f.

The developer on the developing roller 43a is regulated to be thin by the developing doctor 43c. The developer is then transported to the development area, which is the facing area between the photoconductor 41 and the developing roller 43a, to contribute to development. The developed developer is collected to the collection conveyance path 43f. The developer is then transported from the far side to the near side in the direction orthogonal to the space of FIG. 2 to enter the stirring conveyance path 43g through the opening provided in the second partition wall. It is to be noted that the toner is supplied into the stirring conveyance path 43g from a developer supply port provided at an upper part of the stirring conveyance path 43g in the vicinity of the opening of the second partition wall at the upstream end of the stirring conveyance path 43g in the developer conveying direction.

In the supply conveyance path 43e that has received the supply of the developer from the stirring conveyance path 43g, the developer is transported by the supply screw 43b to the immediate vicinity of the most downstream side of the supply conveyance path 43e in the developer conveying direction while being supplied to the developing roller 43a. The surplus developer that was supplied to the developing roller 43a without being used for development and transported to the immediate vicinity of the extreme downstream side of the supply conveyance path 43e in the developer conveying direction is supplied to the stirring conveyance path 43g through a surplus opening of the first partition.

The collected developer sent from the developing roller 43a to the collection conveyance path 43f and transported by the collection screw 43d to the immediate vicinity of the extreme downstream side of the collection conveyance path 43f in the developer conveying direction is supplied to the stirring conveyance path 43g through a collection opening in the second partition wall. While stirring the surplus developer and the collected developer, the stirring conveyance path 43g transports the supplied surplus developer and the collected developer by the stirring screw 43h to a position in the immediate vicinity of the extreme downstream side of the stirring conveyance path 43g in the developer conveying direction and in the immediate vicinity of the extreme upstream side of the supply conveyance path 43e in the developer conveying direction. The developer transported to this position enters the supply conveyance path 43e through a supply opening in the first partition wall.

In the stirring conveyance path 43g, the collected developer, the surplus developer, and the toner to be supplied from the developer supply ports are stirred and transported by the stirring screw 43h in the opposite direction to the developer in the collection conveyance path 43f and the supply conveyance path 43e. The stirred developer is then carried to the immediate vicinity of the extreme upstream side in the developer conveying direction of the supply conveyance path 43e that communicates in the immediate vicinity of the extreme downstream side in the developer conveying direction.

A toner density sensor is provided in the vicinity immediately below the supply opening in the immediate vicinity of the extreme downstream side of the stirring conveyance path 43g in the developer conveying direction. A toner supply control device is driven in response to an output from the toner density sensor. The toner is then supplied into the stirring conveyance path 43g.

The photoconductor cleaning device 44 includes a cleaning blade 44a and an ejection screw 44b. The cleaning blade 44a is an elastic member that is extra-long in the rotation axial direction of the photoconductor 41. A side (i.e., a contact side), which extends in the extra-long direction, of the cleaning blade 44a functions as an edge. The side is pressed against the surface of the photoconductor 41 to separate and remove an adhered substance such as transfer residual toner remaining on the surface of the photoconductor 41. The removed toner is ejected by the ejection screw 44b to the outside of the photoconductor cleaning device 44.

The lubricant coating device 45 includes a lubricant coating brush 45a that functions as a coating brush, a solid lubricant 45b, and a regulating blade 45c. The solid lubricant 45b is held by a bracket 45d and is pressurized by a pressing member toward the lubricant coating brush. The lubricant coating brush 45a rotates in a dragging direction with respect to the rotation direction of the photoconductor 41. The lubricant coating brush 45a scrapes the solid lubricant 45b to apply the lubricant onto the photoconductor 41. A side (abutment side) of the regulating blade 45c extending in the extra-long direction functions as an edge to press against the surface of the photoconductor 41 so as to regulate the lubricant on the surface of the photoconductor 41.

In FIG. 1, the transfer device 10 includes the intermediate transfer belt 11, a belt cleaning device 17, and four primary transfer rollers 46. The intermediate transfer belt 11 is stretched in a tensioned condition by the multiple rollers including a stretching roller 14, a drive roller 15, and a secondary transfer counter roller 16. The intermediate transfer belt 11 is endlessly moved in the clockwise direction in FIG. 1 by the rotation of the drive roller 15 driven by a belt drive motor.

The four primary transfer rollers 46 are arranged to respectively contact an inner circumferential surface side of the intermediate transfer belt 11. A primary transfer bias is applied by a power supply to the primary transfer rollers 46. Moreover, the intermediate transfer belt 11 is pressed by the primary transfer rollers 46 from the inner circumferential surface toward the photoconductors 41 to form respective primary transfer nips. A primary transfer electric field is formed between the photoconductor 41 and the primary transfer roller 46 at each primary transfer nip due to the influence of the primary transfer bias. The toner image formed on the photoconductor 41 is primarily transferred onto the intermediate transfer belt 11 under the influence of the primary transfer electric field and the nip pressure.

Moreover, the transfer device 10 includes a secondary transfer roller 22. The secondary transfer roller 22 is disposed below the intermediate transfer belt 11 and functions as a secondary transfer member. The secondary transfer roller 22 is pressed against the secondary transfer counter roller 16 via the intermediate transfer belt 11, so that a secondary transfer nip is formed. The secondary transfer roller 22 then secondarily transfers the toner images on the intermediate transfer belt 11 at one time onto a recording sheet conveyed to the secondary transfer nip formed between the secondary transfer roller 22 and the intermediate transfer belt 11. The belt cleaning device 17 is provided downstream from the secondary transfer counter roller 16 in the surface movement direction of the intermediate transfer belt 11. The belt cleaning device 17 removes the residual toner that remains on the surface of the intermediate transfer belt 11 after transfer of the image. Moreover, the belt cleaning device 17 includes a lubricant coating mechanism, and applies a lubricant to the surface of the intermediate transfer belt 11.

A fixing device 25 is provided downstream from the secondary transfer roller 22 in a sheet conveying direction. The fixing device 25 fixes the toner image formed on the recording sheet on the surface of the sheet. An endless fixing belt 26 is pressed against a fixing pressure roller 27.

The recording sheet after transfer of the image is conveyed to the fixing device 25 by an endless conveyance belt 24 bridged across a pair of rollers 23. Moreover, a sheet reversing device 28 is provided below the secondary transfer roller 22 to reverse a sheet upon the formation of an image on both the front and back sides of the sheet.

When a color original document is copied with the image forming apparatus 100 including the above-described configurations, the scanner 3 reads an image of the color original document placed on the exposure glass. Moreover, the intermediate transfer belt 11 is rotated to form a toner image on each photoconductor 41 by image forming processes employed to the image forming apparatus 100. Then, the toner images formed on the photoconductors 41 are sequentially superimposed to be primarily transferred onto the intermediate transfer belt 11. Accordingly, the four-color superimposed toner image is formed on the intermediate transfer belt 11.

In parallel with the image forming operations of the four single-color toner images being transferred onto the intermediate transfer belt 11, recording sheets are separated and fed, one by one, from a selected one of the sheet feed trays 21 of the sheet feeder 2. Then, the separated recording sheet is transported to a registration roller pair 29. The separated and transported recording sheet contacts a nip of the registration roller pair 29, thereby stopping the conveyance of the recording sheet temporarily and holding the recording sheet standby. The registration roller pair 29 resumes the rotation thereof at a proper timing in such a manner as to set the positional relationship between the four-color toner image superimposed on the intermediate transfer belt 11 and a leading edge of the recording sheet in predetermined positions. The registration roller pair 29 is rotated to convey the recording sheet on standby again. Consequently, the secondary transfer roller 22 secondarily transfers the four-color toner image on the intermediate transfer belt 11, to a predetermined position of the recording sheet. Thus, a full color toner image is formed on the recording sheet.

The recording sheet with the full color toner image is formed thereon is conveyed to the fixing device 25 that is disposed downstream from the secondary transfer roller 22 in the conveyance path. The fixing device 25 fixes the full color toner image that has been secondarily transferred by the secondary transfer roller 22 to the recording sheet. The recording sheet with the fixed full color image is ejected by an ejection roller 30 to the outside of an apparatus body 110 of the image forming apparatus 100. If a duplex printing mode is selected to form an image on both sides of a recording sheet, when the recording sheet having the full color toner image fixed on a first surface thereof is ejected from the fixing device 25, the recording sheet is conveyed to the sheet reversing device 28 instead of being conveyed to the ejection roller 30. After the front and rear sides of the recording sheet are reversed by the sheet reversing device 28, the recording sheet is conveyed again to the registration roller pair 29. The recording sheet passes through the secondary transfer nip formed between the secondary transfer roller 22 and the intermediate transfer belt 11 and then through the fixing device 25, so that a full color image is formed on a second surface of the recording sheet.

Figure 3:
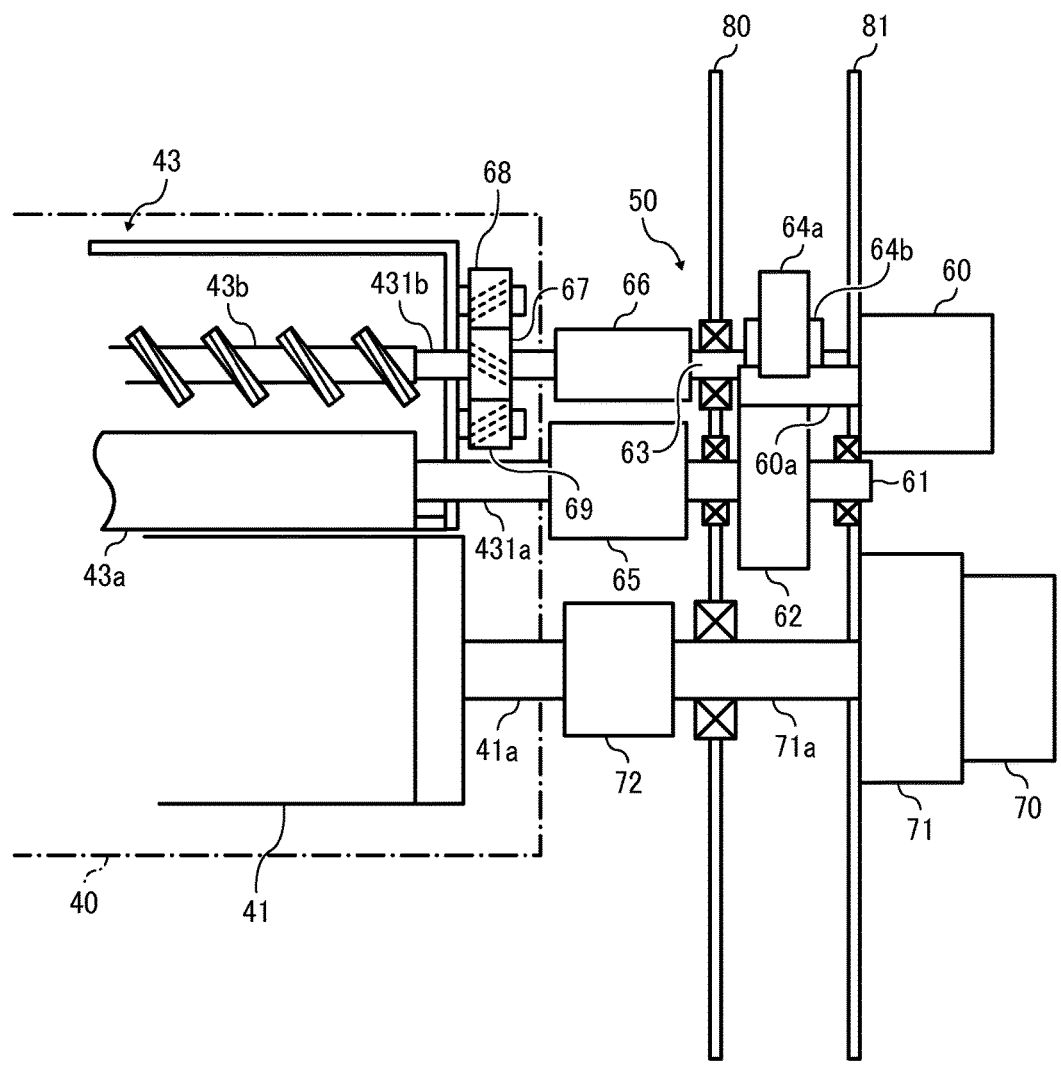
FIG. 3 is a diagram illustrating a schematic configuration of a drive transmitter and its vicinity according to the example of this disclosure.

FIG. 3 is a diagram illustrating a schematic configuration of a drive transmitter 50 and its vicinity according to the example of this disclosure. Specifically, FIG. 3 illustrates the drive transmitter 50 that transmits power to the developing roller 43a of the developing device 43 and the like, and the immediate vicinity of the drive transmitter 50.

The apparatus body 110 of the image forming apparatus 100 is provided with drive devices that drive the photoconductors 41 and the developing devices 43.

A developing motor 60 and a photoconductor motor 70 are fixed to a drive-side plate 81 supported by supports to an apparatus body plate 80. The developing motor 60 is a drive source of the developing device 43. The photoconductor motor 70 that is a drive source of the photoconductor 41 is integrally formed with a reduction drive 71. An output shaft 71a of the reduction drive 71 is integrally formed with the photoconductor motor 70. The output shaft 71a of the reduction drive 71 and a photoconductor shaft 41a of the photoconductor 41 are coupled by a photoconductor coupling 72. The drive force of the photoconductor motor 70 is transmitted to the photoconductor 41 via the reduction drive 71, the photoconductor coupling 72, and the like. The photoconductor 41 is then driven for rotation.

A motor gear created by cutting teeth to an output shaft 60a of the developing motor 60 meshes with a developing drive gear 62 fixed to a developing drive shaft 61. The motor gear also meshes with a screw idler gear 64a. A developing coupling 65 couples the developing drive shaft 61 to a developing roller shaft 431a of the developing roller 43a. Moreover, the screw idler gear 64a meshes with a screw drive gear 64b provided to a screw drive shaft 63. A screw coupling 66 couples the screw drive shaft 63 to a screw shaft 431b of the supply screw 43b. A supply gear 67 is provided to the screw shaft 431b of the supply screw 43b. The supply gear 67 meshes with gears 68 and 68. The gear 69 is provided to a screw shaft of the collection screw 43d. The gear 68 is provided to a screw shaft of the stirring screw 43h.

The drive force of the developing motor 60 is transmitted to the developing roller 43a via the developing drive gear 62, the developing coupling 65, and the like, thereby rotating the developing roller 43a. Moreover, the drive force of the developing motor 60 is transmitted to the supply screw 43b, the collection screw 43d, and the stirring screw 43h via the screw drive gear 64b, the screw coupling 66, and the like, thereby rotating the supply screw 43b, the collection screw 43d, and the stirring screw 43h.

In the present example, the photoconductor 41, the developing device 43, the charging device 42 (see FIG. 2), the photoconductor cleaning device 44 (see FIG. 2), and the lubricant coating device 45 (see FIG. 2) are designed as one process cartridge 40 indicated by a dot-and-dash line in FIG. 3 to be detachably attached to the apparatus body 110 of the image forming apparatus 100.

Next, a description is given of the screw coupling 66 provided in the drive transmitter 50.

A toner supply path is provided around the screw coupling 66 to supply the toner in a toner bottle to the developing coupling 65 and the developing device 43. Moreover, a waste toner conveyance path of the photoconductor cleaning device of the process cartridge arranged adjacent to the developing device 43 and a drive transmitter that transmits a drive force to the ejection screw 44b, and the like are also arranged. As a result, no sufficient space can be obtained around the screw coupling 66. It is preferable that the screw coupling 66 use a coupling with a small outer diameter.

Figure 4A:
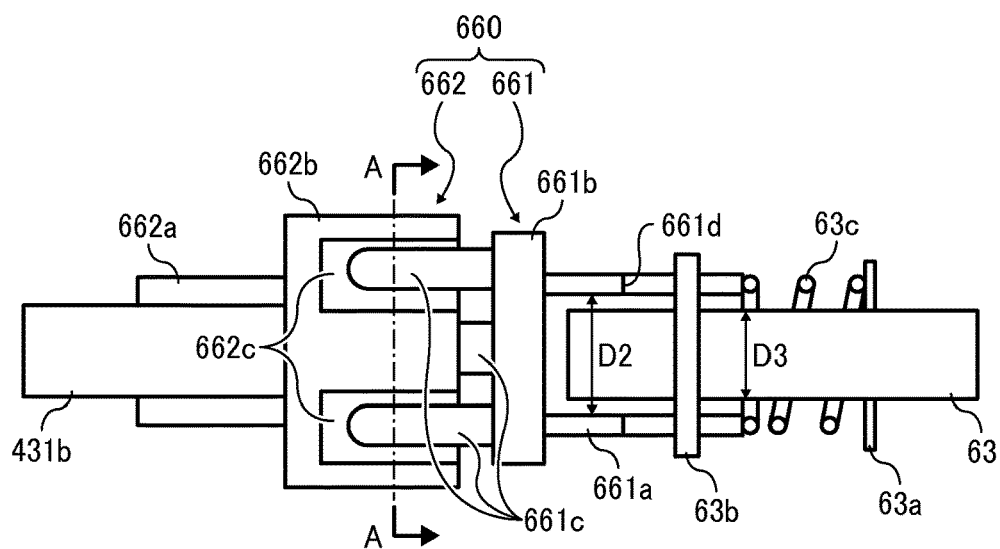
FIGS. 4A and 4B are diagrams illustrating schematic configurations of a screw coupling according to a comparative example.
Figure 4B:
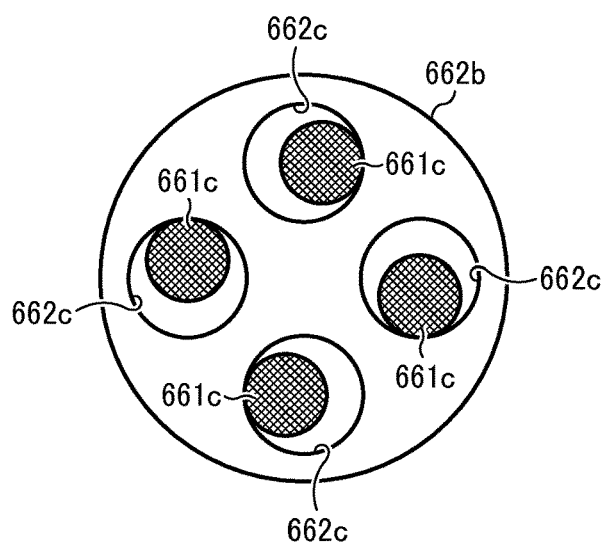

FIGS. 4A and 4B are diagrams illustrating schematic configurations of a screw coupling 660 according to a comparative example. FIG. 4A is a schematic transverse sectional view of the known screw coupling 660. FIG. 4B is an A-A cross-sectional view of FIG. 4A.

The screw coupling 660 includes a first coupling 661 and a second coupling 662. The first coupling 661 functions as a first coupler that is mounted on an axial end of the screw drive shaft 63 that functions as a first rotary shaft. The second coupling 662 functions as a second coupler that is mounted on an axial end of the screw shaft 431b that functions as a second rotary shaft. The first coupling 661 includes a tubular shaft insertion portion 661a to which the screw drive shaft 63 is inserted, a disc-shaped base 661b, and four columnar drive claws 661c that extends straight from the base 661b in the axial direction. The four drive claws 661c, each functioning as an extension, are arranged at regular intervals in the rotation direction on the base 661b.

The shaft insertion portion 661a that functions as a mounting hole part is provided with a pin fitting hole 661d having a long hole shape extending in the axial direction. A pin 63b is inserted to the pin fitting hole 661d and press-fitted to a pin hole of the screw drive shaft 63. Accordingly, the first coupling 661 is mounted on the screw drive shaft 63. Moreover, an inner diameter D2 of the shaft insertion portion 661a of the first coupling 661 is greater than an outer diameter D3 of the screw drive shaft 63. There is a predetermined clearance between the shaft insertion portion 661a and the screw drive shaft 63. Consequently, the first coupling 661 can be arranged to be swingable about the pin 63b in a given area. In other words, the first coupling 661 can be arranged to be inclinable by a given angle with respect to the axial direction.

A ring-shaped spring bearing 63a is inserted to be fit in the screw drive shaft 63. A coil spring 63c that functions as a biasing member is arranged between the spring bearing 63a and the first coupling 661. The pin fitting hole 661d of the shaft insertion portion 661a has a long hole shape extending in the axial direction. The first coupling 661 is mounted on the screw drive shaft 63 movably in a given area in a direction where the coil spring 63c is compressed, i.e., in the axial direction thereof.

The second coupling 662 includes a tubular shaft fitting portion 662a and a cup 662b. The screw shaft 431b is fitted to the tubular shaft fitting portion 662a. The cup 662b is provided with four claw insertion holes 662c at regular intervals in the rotation direction so that the drive claws 661c of the first coupling 661 are inserted to the respective claw insertion holes 662c. The claw insertion holes 662c functions as extension insertion holes. The inner diameter of each claw insertion hole 662c is greater than the outer diameter of each drive claw 661c. Even if there is axial misalignment between the screw drive shaft 63 and the screw shaft 431b, the drive claws 661c can be inserted to the claw insertion holes 662c reliably.

The drive claws 661c of the first coupling 661 are inserted to the claw insertion holes 662c of the second coupling 662. By so doing, the screw drive shaft 63 is coupled to the screw shaft 431b. When the screw drive shaft 63 is rotated with the drive force applied by the developing motor 60, the drive claw 661c in the claw insertion hole 662c contacts an inner circumferential surface of the claw insertion hole 662c, thereby transmitting the drive force applied by the developing motor 60 to the second coupling 662 via the drive claw 661c. With the above-described operation, the screw shaft 431b is rotated.

When a process cartridge (e.g., the process cartridge 40 previously illustrated in FIG. 3) is moved in the axial direction to be inserted to an apparatus body of an image forming apparatus, the drive claws 661c of the first coupling 661 are inserted to the claw insertion holes 662c of the second coupling 662. Consequently, the screw shaft 431b is coupled to the screw drive shaft 63. At this time, if the claw insertion hole 662c is out of phase with the drive claw 661c, the drive claw 661c hits a surface of the cup 662b between the claw insertion holes 662c. The first coupling 661 then moves in the direction where the coil spring 63c is compressed. Even if the drive claws 661c cannot be inserted to the claw insertion holes 662c, the process cartridge can be inserted to the apparatus body of the image forming apparatus. In this case, when a developing motor is rotated to rotate the first coupling 661, and the phases of the drive claws 661c and the claw insertion holes 662c are aligned. The first coupling 661 then moves toward the second coupling 662 by the biasing force of the coil spring 63c. The drive claws 661c enter the claw insertion holes 662c. Consequently, the screw drive shaft 63 is coupled to the screw shaft 431b to rotate the screw shaft 431b.

Moreover, if there is the axial misalignment between the screw drive shaft 63 and the screw shaft 431b, the first coupling 661 inclines with respect to the axial direction. Consequently, the drive claws 661c are inserted to the claw insertion holes 662c, and therefore the screw drive shaft 63 can be coupled to the screw shaft 431b.

In recent years, a space around a screw coupling has been reduced to promote a reduction in the size of an image forming apparatus. Therefore, the outer diameter of the screw coupling is reduced to $\phi$12 mm or smaller. As the outer diameter of the screw coupling is more reduced, the outer diameter of the drive claw 661c is also more reduced.

Figure 5C:
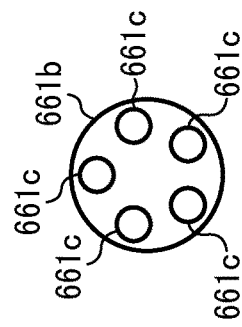
FIGS. 5A through 5C are diagrams illustrating a relation of an outer diameter of the screw coupling, the number of drive claws, and the outer diameter of the drive claw.
Figure 5B:
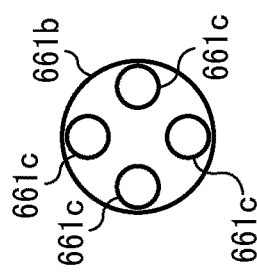
Figure 5A:
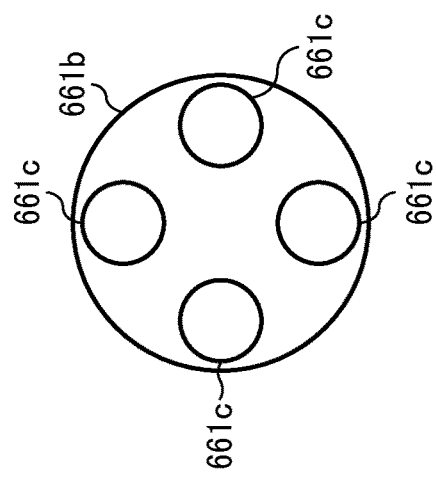

FIGS. 5A through 5C are diagrams illustrating a relation of the outer diameter of the screw coupling, the number of the drive claws 661c, and the outer diameter of the drive claw 661c.

As illustrated in FIG. 5A, when the outer diameter of the screw coupling is approximately $\phi$20 mm, the outer diameters of the four drive claws 661c can be set to approximately $\phi$5 mm. If the outer diameter of each drive claw 661c is larger than this, the axial misalignment is not sufficiently tolerable. In other words, in order to sufficiently tolerate the axial misalignment, a given clearance is provided between the claw insertion hole 662c and the drive claw 661c. However, if the outer diameter of the drive claw 661c is set to be greater than $\phi$5 mm, when the outer diameter of the screw coupling is approximately $\phi$20 mm, it becomes difficult to provide the cup 662b with the claw insertion holes 662c that can tolerate the axial misalignment sufficiently.

Moreover, when the outer diameter of the screw coupling is approximately $\phi$10 mm, the drive claw 661c can be provided with the outer diameter of approximately $\phi$3 mm, as illustrated in FIG. 5B.

As the number of the drive claws 661c is increased, the drive claws 661c move smoothly in the claw insertion holes 662c when there is the axial misalignment between the screw shaft 431b and the screw drive shaft 63. As the number of the drive claws 661c is increased, a contact pressure of the drive claw 661c with the inner circumferential surface of the claw insertion hole 662c upon drive transmission is reduced. By so doing, the frictional force between the drive claw 661c and the inner circumferential surface of the claw insertion hole can be reduced. Consequently, when there is the axial misalignment between the screw shaft 431b and the screw drive shaft 63, the drive claws 661c move smoothly in the claw insertion holes 662c, and an axial reaction force can be reduced. As a result, occurrence of nonuniformity in density such as banding can be preferably prevented. Further, the wearing of the drive claws 661c and the inner circumferential surfaces of the claw insertion holes can be reduced, and the service life of the screw coupling can be extended.

However, as illustrated in FIG. 5C, when the number of the drive claws 661c was changed from four to five in the screw coupling 660 with an outer diameter of $\phi$10 mm, it was approximately $\phi$2 mm that was ensured for the outer diameter of the drive claw 661c. When the drive force was transmitted with a screw coupling illustrated in FIG. 5C, problems such as the deformation of the drive claw 661c due to lack of the strength of the drive claw 661c occurred.

In addition, there is also a coupling where the first coupling is a spline shaft and the second coupling is an internal gear. However, a coupling with an outer diameter of φ10 mm or smaller has a problem that it is difficult to create teeth and it leads to an increase in the cost of the image forming apparatus.

Further, the comparative screw coupling 660 previously illustrated in FIGS. 4A and 4B also has the following issue.

In the comparative screw coupling 660 illustrated in FIGS. 4A and 4B, the first coupling 661 is mounted on the screw drive shaft 63 to be movable in the given area in the axial direction. Moreover, the coil spring 63c is arranged between the first coupling 661 and the spring bearing 63a. The coil spring 63c biases the first coupling 661 toward the second coupling 662. Furthermore, the inner diameter D2 of the shaft insertion portion 661a is made greater than the outer diameter D3 of the screw drive shaft 63, thereby swinging the first coupling 661 (inclining the first coupling 661 by a given angle).

As described above, in the comparative screw coupling 660, the first coupling 661 is biased by the coil spring 63c. Therefore, in order to tolerate the axial misalignment between the screw drive shaft 63 and the screw shaft 431b, the first coupling 661 receives a biasing force from the coil spring 63c to return to parallel to the axial direction when the first coupling 661 inclines with respect to the axial direction. Therefore, the first coupling 661 cannot swing (i.e., cannot incline by a given angle) smoothly, and the first coupling 661 cannot be connected to the second coupling 662. Moreover, if the first coupling 661 inclines and the screw drive shaft 63 is coupled to the screw shaft 431b, the biasing force in a normal direction acts on the second coupling 662 via the drive claws 661c. As a result, the screw shaft 431b warps, and therefore vibrations and the like occur and an abnormal image such as banding is created.

Furthermore, in the comparative coupling, it was also likely that the coil spring 63c enters the clearance between the screw drive shaft 63 and the shaft insertion portion 661a.

Next, a detailed description is given of the screw coupling 66 according to the present example of this disclosure with reference to the drawings. In the following description, the configurations common to the comparative screw coupling 660 previously illustrated in FIGS. 4A and 4B, may be omitted as appropriate.

Figure 6A:
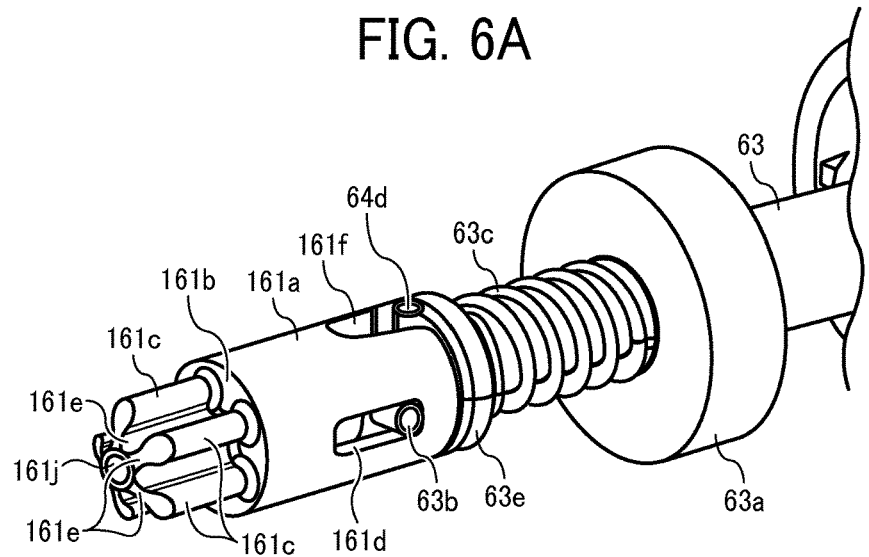
FIGS. 6A through 6C are diagrams illustrating a first coupling of a screw coupling of an example of this disclosure.
Figure 6B:
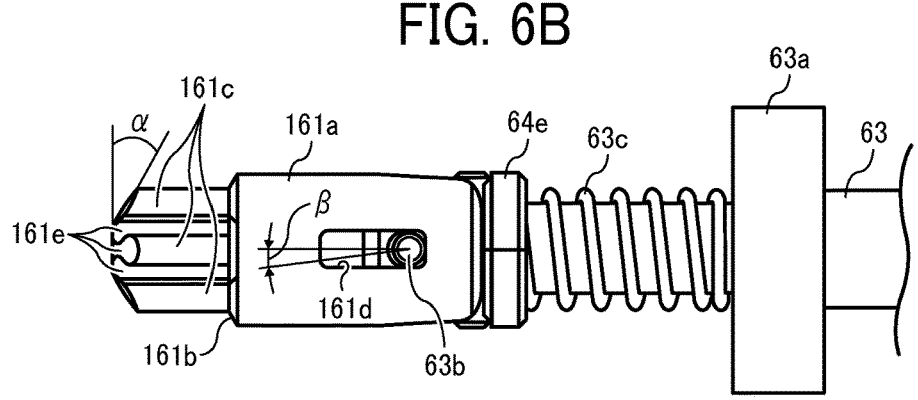
Figure 6C:
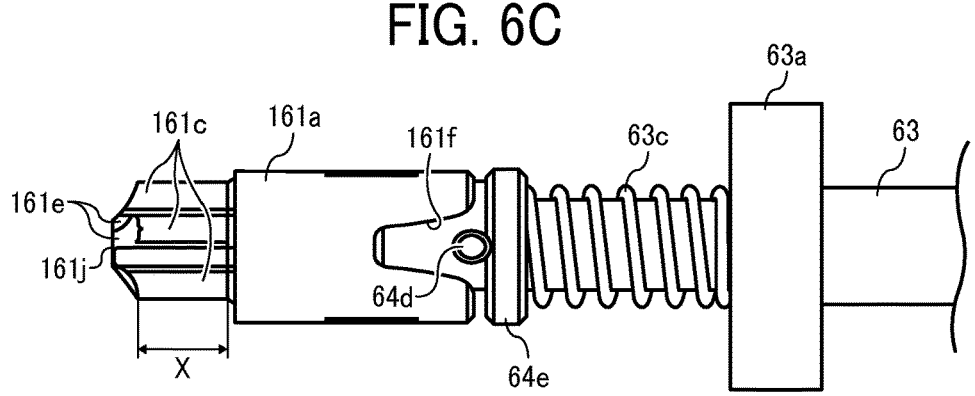
Figure 7:
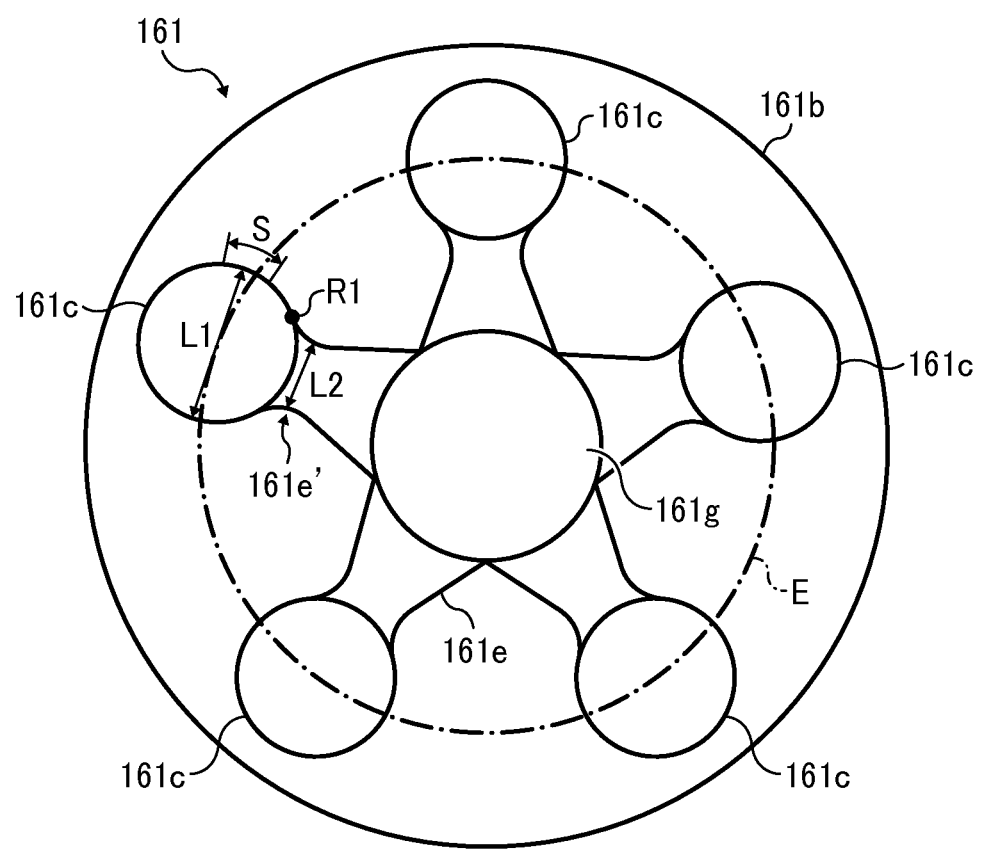
FIG. 7 is a front view of the first coupling according to the example of this disclosure.

FIGS. 6A through 6C are diagrams illustrating the first coupling 161 of the screw coupling 66 of an example of this disclosure. Specifically, FIG. 6A is a perspective view of a first coupling 161. FIG. 6B is a side view of the first coupling 161. FIG. 6C is a plan view of the first coupling 161. Further, FIG. 7 is a front view of the first coupling 161.

The screw coupling 66 includes the first coupling 161 and a second coupling 162. The first coupling 161 functions as a first coupler that is mounted on an axial end of the screw drive shaft 63 that functions as a first rotary shaft. The second coupling 162 functions as a second coupler that is mounted on an axial end of the screw shaft 431b that functions as a second rotary shaft. The first coupling 161 includes a tubular shaft insertion portion 161a to which the screw drive shaft 63 is inserted, a disc-shaped base 161b, and four columnar drive claws 161c that extends straight from the base 161b in the axial direction. The four drive claws 161c, each functioning as an extension, are arranged at regular intervals in the rotation direction on the base 161b.

The shaft insertion portion 161a that functions as a mounting hole part is provided with a pin fitting hole 161d having a long hole shape extending in the axial direction. A pin 63b that extends from outside the screw drive shaft 63 and functions as a drive transmitting member is inserted to the pin fitting hole 161d and press-fitted to a pin hole of the screw drive shaft 63. Accordingly, the first coupling 161 is mounted on the screw drive shaft 63. Moreover, an inner diameter D2 of the shaft insertion portion 161a of the first coupling 161 is greater than an outer diameter D3 of the screw drive shaft 63. There is a predetermined clearance between the shaft insertion portion 161a and the screw drive shaft 63. Consequently, the first coupling 161 can be arranged to be swingable about the pin 63b in a given area. In other words, the first coupling 161 can be arranged to be inclinable by a given angle with respect to the axial direction.

A ring-shaped spring bearing 63a is inserted to be fit in the screw drive shaft 63. A coil spring 63c that functions as a biasing member is arranged between the spring bearing 63a and the first coupling 161. The pin fitting hole 161d of the shaft insertion portion 161a has a long hole shape extending in the axial direction. The first coupling 161 is mounted on the screw drive shaft 63 movably in a given area in a direction where the coil spring 63c is compressed, i.e., in the axial direction thereof.

The second coupling 162 includes a tubular shaft fitting portion 162a and a cup 162b. The screw shaft 431b is fitted to the tubular shaft fitting portion 162a. The cup 162b is provided with four claw insertion holes 162c at regular intervals in the rotation direction so that the drive claws 161c of the first coupling 161 are inserted to the respective claw insertion holes 162c. The claw insertion holes 162c functions as extension insertion holes. The inner diameter of each claw insertion hole 162c is greater than the outer diameter of each drive claw 161c. Even if there is axial misalignment between the screw drive shaft 63 and the screw shaft 431b, the drive claws 161c can be inserted to the claw insertion holes 162c reliably.

The drive claws 161c of the first coupling 161 are inserted to the claw insertion holes 162c of the second coupling 162. By so doing, the screw drive shaft 63 is coupled to the screw shaft 431b. When the screw drive shaft 63 is rotated with the drive force applied by the developing motor 60, the drive claw 161c in the claw insertion hole 162c contacts an inner circumferential surface of the claw insertion hole 162c, thereby transmitting the drive force applied by the developing motor 60 to the second coupling 162 via the drive claw 161c. With the above-described operation, the screw shaft 431b is rotated.

When the process cartridge 40 previously illustrated in FIG. 3 is moved in the axial direction to be inserted to the apparatus body 110 of the image forming apparatus 100, the drive claws 161c of the first coupling 161 are inserted to the claw insertion holes 162c of the second coupling 162. Consequently, the screw shaft 431b is coupled to the screw drive shaft 63. At this time, if the claw insertion hole 162c is out of phase with the drive claw 161c, the drive claw 161c hits a surface of the cup 162b between the claw insertion holes 162c. The first coupling 161 then moves in the direction where the coil spring 63c is compressed. Even if the drive claws 161c cannot be inserted to the claw insertion holes 162c, the process cartridge 40 can be inserted to the apparatus body 110 of the image forming apparatus 100. In this case, when the developing motor 60 is rotated to rotate the first coupling 161, and the phases of the drive claws 161c and the claw insertion holes 162c are aligned. The first coupling 161 then moves toward the second coupling 162 by the biasing force of the coil spring 63c. The drive claws 161c enter the claw insertion holes 162c. Consequently, the screw drive shaft 63 is coupled to the screw shaft 431b to rotate the screw shaft 431b.

Moreover, if there is the axial misalignment between the screw drive shaft 63 and the screw shaft 431b, the first coupling 161 inclines with respect to the axial direction. Consequently, the drive claws 161c are inserted to the claw insertion holes 162c, and therefore the screw drive shaft 63 can be coupled to the screw shaft 431b.

In recent years, a space around a screw coupling has been reduced to promote a reduction in the size of an image forming apparatus. Therefore, the outer diameter of the screw coupling is reduced to ϕ12 mm or smaller. As the outer diameter of the screw coupling is more reduced, the outer diameter of the drive claw 161c is also more reduced.

The first coupling 161 of the present example has an outer diameter of ϕ10 mm. The base 161b is provided with five columnar drive claws 161c, each functioning as an extension, with an outer diameter ϕ3 mm at regular intervals in the rotation direction. Moreover, the first coupling 161 of the present example is provided with reinforcing ribs 161e that reinforce the drive claws 161c, respectively. The reinforcing ribs 161e extend from their respective drive claws 161c toward the center of the rotation of the first coupling 161, and are coupled at a rotation center of the first coupling 161.

With this configuration of the screw coupling 66 of the present example, each drive claw 161c is reinforced with the reinforcing rib 161e. Therefore, even if the outer diameter of the drive claw 161c is short, deformation of the drive claw 161c that can occur upon drive force transmission can be prevented. Furthermore, the reinforcing ribs 161e of the drive claws 161c are coupled to couple the drive claws 161c. Consequently, the drive claws 161c can be further reinforced.

Moreover, as illustrated in FIG. 7, a coupling portion 161e' provided between the drive claw 161c and the reinforcing rib 161e is formed in an R shape. By forming the coupling portion 161e' to such an R shape, the strength of the coupling portion 161e' can be increased.

The drive claw 161c abuts against the inner circumferential surface of the claw insertion hole 162c of the second coupling 162 to transmit the drive force upon drive transmission. Therefore, the drive claw 161c receives torque in the rotation direction. At this time, mechanical stress is concentrated on the coupling portion 161e' between the drive claw 161c and the reinforcing rib 161e, and consequently, the coupling portion 161e' is prone to breakage. In the present example, the coupling portion 161e' is formed in an R shape to increase the strength of the coupling portion 161e'. By so doing, the coupling portion 161e' can be prevented from being damaged or broken.

Moreover, in the present example, the reinforcing rib 161e is coupled to the drive claw 161c such that the reinforcing rib 161e does not contact respective contact parts 162h on the inner circumferential surface of the claw insertion hole 162c of the second coupling 162 upon drive transmission. Specifically, as illustrated in FIG. 7, a distance (thickness) L2 of the reinforcing rib 161e in the vicinity of the coupling portion 161e' thereof is made shorter or smaller than a diameter L1 of the drive claw 161c. Moreover, an end R1 of the R-shaped coupling portion 161e' on a side of the drive claw 161c is located closer to the center of rotation than a drive coupling circle E that links the respective centers of the drive claws 161c. The drive coupling circle E is indicated by a dot-and-dash line in FIG. 7. More specifically, the end R1 of the coupling portion 161e' on the side of the drive claw 161c is located closer to the center of rotation than an area S of the drive claw 161c. The area S abuts against the inner circumferential surface of the claw insertion hole 162c. Consequently, the reinforcing rib 161e can be prevented from contacting the inner circumferential surface of the claw insertion hole 162c upon drive transmission and be prevented from moving away from the inner circumferential surface of the claw insertion hole 162c upon drive transmission.

Figure 8:
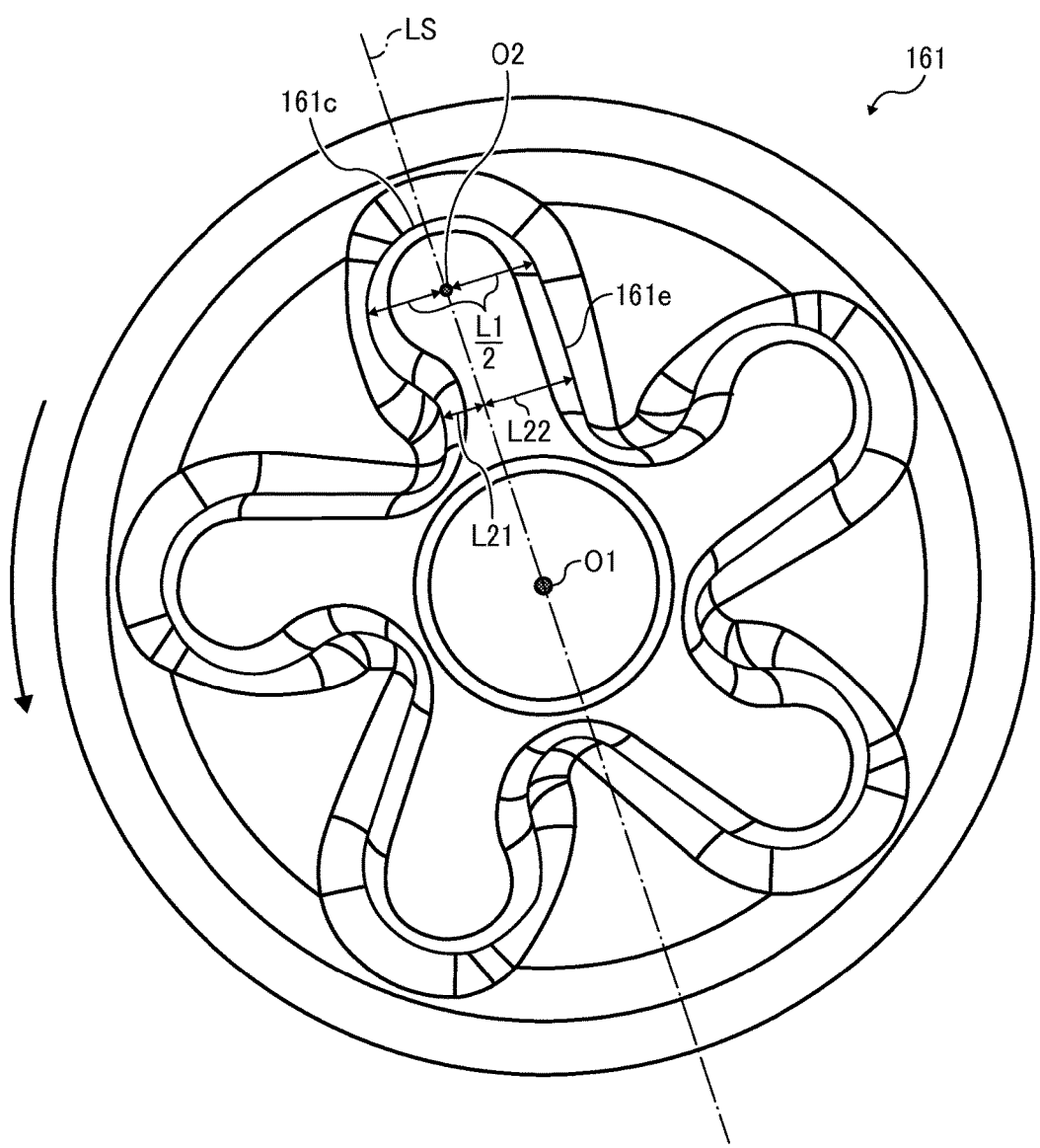
FIG. 8 is a diagram illustrating a reinforcing rib having an upstream thickness that is greater than a downstream thickness in a rotation direction thereof.

FIG. 8 is a diagram illustrating the reinforcing rib 161e having an upstream thickness that is greater than a downstream thickness in the rotation direction thereof.

Further, if the first coupling 161 is designed to rotate in a single direction, an upstream side of the reinforcing rib 161e in the rotation direction may be thicker than a downstream side thereof, as illustrated in FIG. 8. Specifically, when viewing the first coupling 161 in the axial direction as illustrated in FIG. 8, based on a line segment LS that connects a center of rotation O1 of the first coupling 161 and a center O2 of the drive claw 161c, a thickness L22 of the reinforcing rib 161e on an upstream side in the rotation direction of the first coupler 161 upon drive transmission is made greater than a thickness L21 of the reinforcing rib 161e on a downstream side in the rotation direction thereof upon drive transmission.

With this configuration, at the downstream side in the rotation direction based on the line segment LS, the thickness L21 of the reinforcing rib 161e is shorter than a radius L1/2 of the drive claw 161c. Consequently, the reinforcing rib 161e does not contact the contact parts 162h on the inner circumferential surface of the claw insertion hole 162c of the second coupling 162. Therefore, the drive claw 161c can contact the inner circumferential surface of the claw insertion hole 162c upon drive transmission.

If the first coupling 161 rotates in a single direction as indicated by arrow (a counterclockwise direction) in FIG. 8, a face on a side of a clockwise direction of the drive claw 161c does not contact the inner circumferential surface of the claw insertion hole 162c of the second coupling 162 to transmit a drive force. Therefore, the reinforcing rib 161e is not formed in an arc-shaped concave with respect to the drive claw 161c such that the reinforcing rib 161e does not contact the inner circumferential surface of the claw insertion hole 162c of the second coupling 162. Therefore, when the first coupling 161 rotates in a single direction as indicated by arrow in FIG. 8, the thickness L22 of the reinforcing rib 161e on the upstream side in the rotation direction based on the line segment LS is substantially same in length as the radius L1/2 of the drive claw 161c. Consequently, the reinforcing rib 161e of the configuration illustrated in FIG. 8 is thicker than the reinforcing rib 161e of the configuration illustrated in FIG. 7, and therefore can increase in strength and reinforce the drive claw 161c preferably. As a result, inconvenience such as deformation of the drive claw 161c can be prevented.

Moreover, when compared with the configuration illustrated in FIG. 7, the reinforcing rib 161e of the configuration illustrated in FIG. 8 can reduce a difference between the thickness of the reinforcing rib 161e and the thickness of the drive claw 161c, and therefore can avoid irregularity in thickness. Consequently, when the first coupling 161 is a resin molded product, the first coupling 161 illustrated in FIG. 8 can be more enhanced in the formability than the first coupling 161 illustrated in FIG. 7.

Moreover, in the present example, as illustrated in FIGS. 6A through 6C, a bearing pin 64d is press-fitted in the screw drive shaft 63 between the coil spring 63c and the first coupling 161. The bearing pin 64d functions as a bearing member to receive the biasing force of the coil spring 63c. Moreover, a ring-shaped intermediate member 64e is arranged between the bearing pin 64d and the coil spring 63c.

The intermediate member 64e is movably mounted on the screw drive shaft 63 in the axial direction. Specifically, the inner diameter of the intermediate member 64e is made greater than the screw drive shaft 63. Consequently, a clearance between the intermediate member 64e and the screw drive shaft 63 can be moved with respect to the screw drive shaft 63 and can be made smaller than the diameter of a metal wire that forms the coil spring 63c. Moreover, a bearing pin escape 161f that is cut largely in the axial direction is formed in a portion where the shaft insertion portion 161a of the first coupling 161 disposed facing the bearing pin 64d.

Moreover, a rotation center part 161g of the reinforcing ribs 161e projects closer to the second coupling 162 than the drive claws 161c. A leading end surface of the reinforcing rib 161e extending from the drive claw 161c toward the rotation center is an inclined surface or a slope formed to decline toward the rotation center as approaching or coming closer to the second coupling 162. An inclination angle α of the slope is greater than an inclination angle with respect to the axial direction under the own weight of the first coupling 161.

Figure 9:
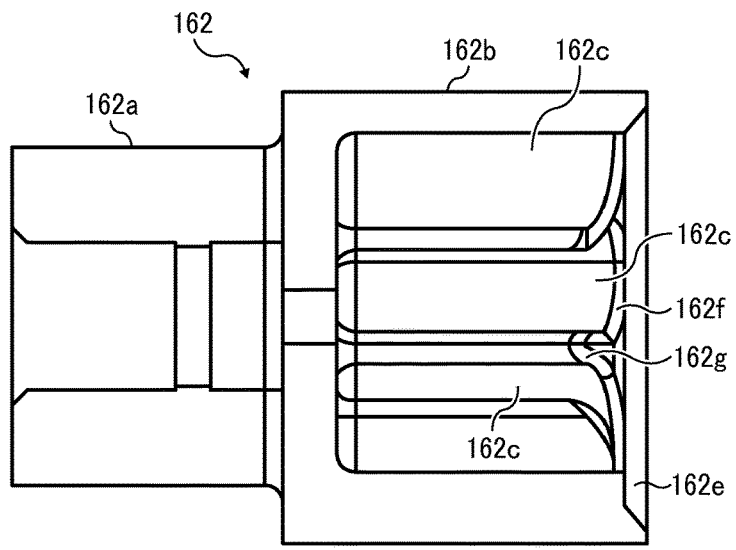
FIG. 9 is a transverse sectional view of a second coupling of the screw coupling of the example of this disclosure.
Figure 10:
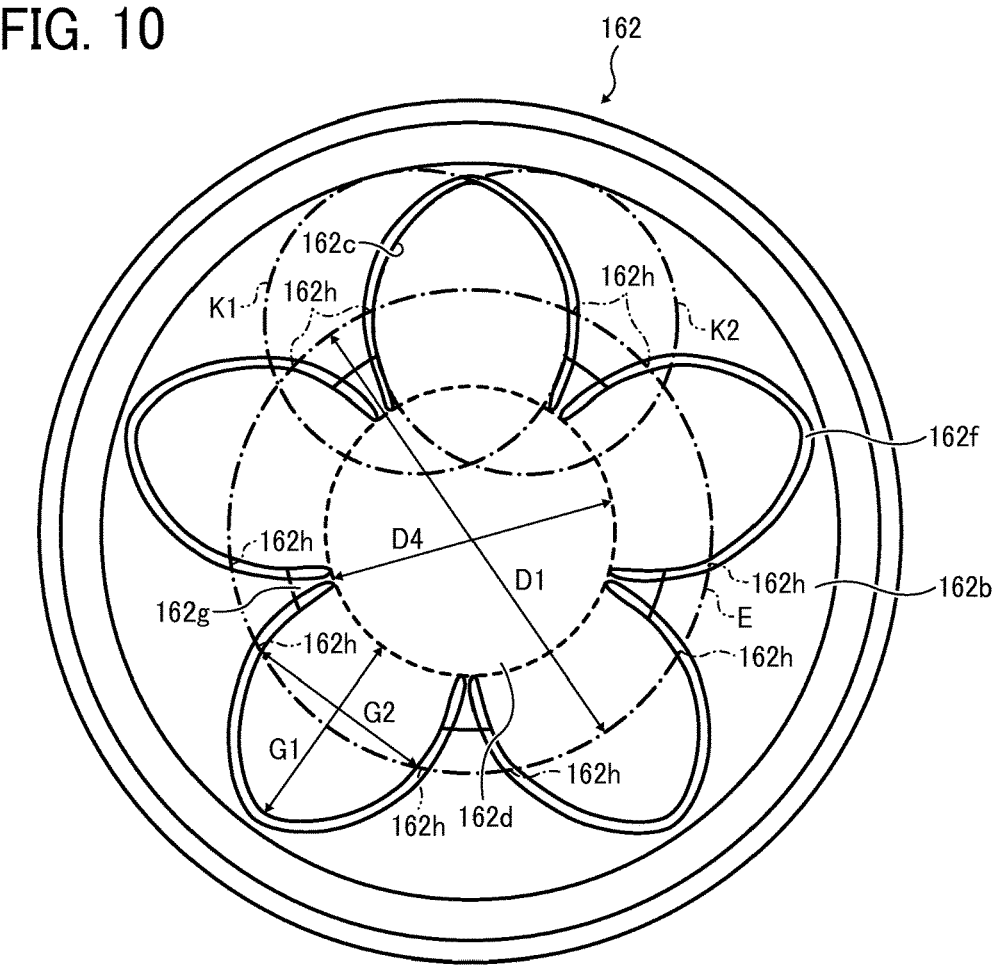
FIG. 10 is a front view of the second coupling of the screw coupling of the example of this disclosure.

FIG. 9 is a transverse sectional view of the second coupling 162 of the screw coupling 66 of the present example. FIG. 10 is a front view of the second coupling 162 of the screw coupling 66 of the present example.

The second coupling 162 of the present example also has an outer diameter of ϕ10 mm. As illustrated in FIG. 9, a rib insertion hole 162d is provided to a center of the cup 162b of the second coupling 162. The rib insertion hole 162d is where the reinforcing ribs 161e of the first coupling 161 are inserted upon coupling. The claw insertion holes 162c are provided at five points at regular intervals around the rib insertion hole 162d. The claw insertion holes 162c are coupled to the rib insertion hole 162d.

One inner circumferential surface of the claw insertion hole 162c in the rotation direction is an arc of a circle K2 having the center on the above-described drive coupling circle E. The other inner circumferential surface is an arc of a circle K1 having the center on the drive coupling circle E and at a position different from the circle K2. In other words, the claw insertion hole 162c has a shape of an overlapping part of the circle K2 and the circle K1. With such a configuration, a length G2 of the claw insertion hole 162c in the rotation direction can be made shorter or smaller than a length G1 of the claw insertion hole 162c in the normal direction.

Figure 11C:
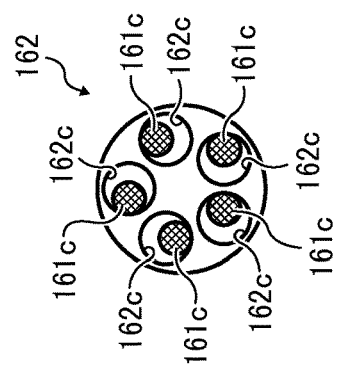
FIGS. 11A through 11C are diagrams illustrating a relation of the outer diameter of the screw coupling, the inner diameter of a claw insertion hole, and the number of claw insertion holes.
Figure 11B:
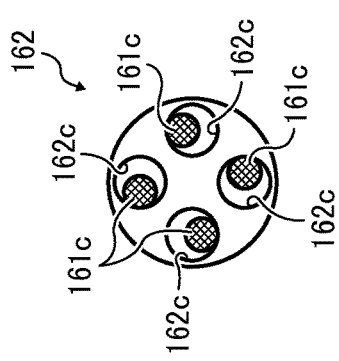
Figure 11A:
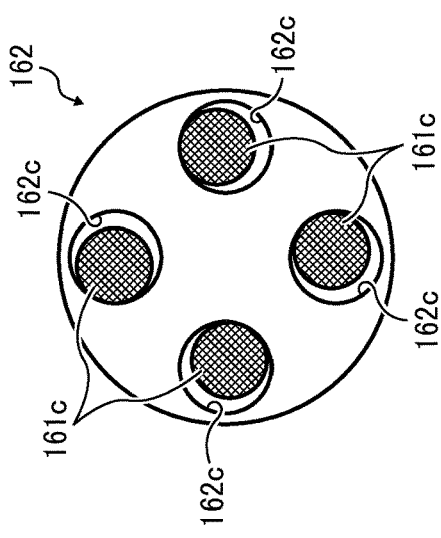

FIGS. 11A through 11A are diagrams illustrating a relation of the outer diameter of the screw coupling 66, the inner diameter of the claw insertion hole 162c, and the number of the claw insertion holes 162c.

As previously described with reference to FIGS. 5A through 5C, when the outer diameter of the screw coupling is approximately ϕ20 mm, the outer diameters of the four drive claws 161c are approximately ϕ5 mm. In this case, as illustrated in FIG. 11A, the inner diameter of the claw insertion hole 162c that can tolerate the axial misalignment is approximately ϕ7 mm. At this time, sufficient intervals are obtained between the claw insertion holes and the strength of the second coupling 162 can be retained. Moreover, when the outer diameter of the screw coupling is approximately ϕ10 mm, the outer diameter of the drive claw 161c is approximately ϕ3 mm as described above. In this case, as illustrated in FIG. 11B, the inner diameter of the claw insertion hole 162c that can tolerate the axial misalignment is approximately ϕ4 mm. Also in this case, sufficient intervals are obtained between the claw insertion holes and the strength of the second coupling 162 can be maintained.

However, as in the present example, when the outer diameter of the screw coupling is approximately ϕ10 mm and five drive claws 161c with an outer diameter of approximately ϕ3 mm are arranged, if the claw insertion holes 162c are formed as round holes, the intervals between the claw insertion holes 162c are reduced as illustrated in FIG. 11C. As a result, it is likely that the strength of the second coupling 162 falls short.

In order to address this inconvenience, as described above, the configuration of the present example includes the claw insertion hole 162c that is formed in the shape of the overlapping part of the circle K2 and the circle K1 and makes the length G2 of the drive claw in the rotation direction shorter than the length G1 in the normal direction. Consequently, as previously illustrated in FIG. 11C, the intervals between the claw insertion holes 162c can be widened as compared to the case in which the claw insertion hole 162c is a round hole. Consequently, a reduction in strength of the second coupling 162 can be prevented. Moreover, approximately 3 mm can be ensured for the length in the normal direction that can tolerate the axial misalignment.

Moreover, as illustrated in FIGS. 9 and 10, an edge of the claw insertion hole 162c is inclined toward the inside of the claw insertion hole 162c to form a claw guide surface 162f for guiding the drive claw 161c to the claw insertion hole 162c. Moreover, an edge of the rib insertion hole 162d between the claw insertion holes 162c is also inclined toward the inside of the rib insertion hole 162d to form a rib guide surface 162g for guiding the reinforcing ribs 161e to the rib insertion hole 162d.

When there is no axial misalignment between the screw drive shaft 63 and the screw shaft 431b, the first coupling 161 is connected to the second coupling 162 without inclining with respect to the axial direction. At this time, the drive claw 161c contacts a portion where the inner circumferential surface of the claw insertion hole 162c intersects with the drive coupling circle E illustrated in FIG. 10. By contrast, if there is the axial misalignment between the screw drive shaft 63 and the screw shaft 431b, the first coupling 161 inclines with respect to the axis and is connected to the second coupling 162. If a drive force is transmitted in this state, the drive claw 161c slides along the inner circumferential surface of the claw insertion hole 162c in a predetermined area, centering the contact position between the claw insertion hole 162c and the drive claw 161c (the intersection of the claw insertion hole 162c with the drive coupling circle E, as illustrated in FIG. 10) in a case in which there is no axial misalignment. The drive claw 161c is closest to the rib insertion hole 162d at a given position in the rotation direction, and is furthest away from the rib insertion hole 162d at a position shifted by an angle of 180 degrees in the rotation direction from the given position.

When the first coupling 161 is swung or inclined with respect to the axis, a leading end (a far end) of the drive claw 161c is most largely displaced. Therefore, when the first coupling 161 is connected to the second coupling 162 in a state in which the first coupling 161 is inclined with respect to the axis, it is likely that the leading end of the drive claw 161c is located at the rib insertion hole 162d without being slid into the claw insertion hole 162c at the position where the drive claw 161c is closest to the rib insertion hole 162d in the rotation direction. When the drive force is transmitted in this state, the leading end of the drive claw 161c is likely to be caught on the edge of the rib insertion hole 162d between the claw insertion holes 162c. As a result, an axial reaction force may be generated to generate vibrations and the like. The maximum movement amount of the leading end of the drive claw 161c can be expressed by X SIN θ, where "θ" represents the maximum inclination angle that can be taken by the first coupling 161 when the first coupling 161 is connected to the second coupling 162 and "X" represents a length of the drive claw 161c (see FIG. 6C). The maximum inclination angle θ is an inclination angle of the first coupling 161 in a case in which the first coupling 161 is connected to the second coupling 162 with the maximum axial misalignment amount mechanically generated from variations in the axial centers on the drive side and on the developing device 43 side. The maximum inclination angle θ is what is called an inclination angle with the maximum axial misalignment amount.

When an inequality is (D1−D4)/2>X SIN θ, where "D1" represents the diameter of the drive coupling circle E and "D4" represents the inner diameter of the rib insertion hole 162d, the following effects can be obtained. In other words, when the first coupling 161 is connected to the second coupling 162 in a state in which the first coupling 161 is inclined with respect to the axis, the leading end of the drive claw 161c can be slid and inserted to the rib insertion hole 162d without coming out of the claw insertion hole 162c even at the position where the drive claw 161c is closest to the rib insertion hole 162d in the rotation direction. Consequently, the leading end of the drive claw 161c is not caught on the edge of the rib insertion hole 162d upon drive transmission. As a result, even if there is the axial misalignment, the drive claw 161c moves smoothly in the claw insertion hole and to prevent occurrence of vibrations.

Moreover, it is preferable that the first coupling 161 is formed of metal and the second coupling 162 is formed of resin. By forming the first coupling 161 of metal, the strength can be increased as compared to a case in which the first coupling 161 is formed of resin. In addition, the drive claw 161c can be further prevented from being broken and deformed. Moreover, the first coupling 161 is formed of resin having the flexural modulus greater than the second coupling 162. By so doing, the strength of the first coupling 161 is maintained and the employment of injection molding can perform a low cost manufacturing. As a result, the first coupling 161 formed of resin can achieve a reduction in cost when compared with the first coupling formed of metal. By contrast, the second coupling 162 that is even formed of resin does not deform. Hence, by forming the second coupling 162 of resin, the second coupling 162 can be manufactured by injection molding at low cost, thereby reducing the cost of the image forming apparatus 100.

Figure 12A:
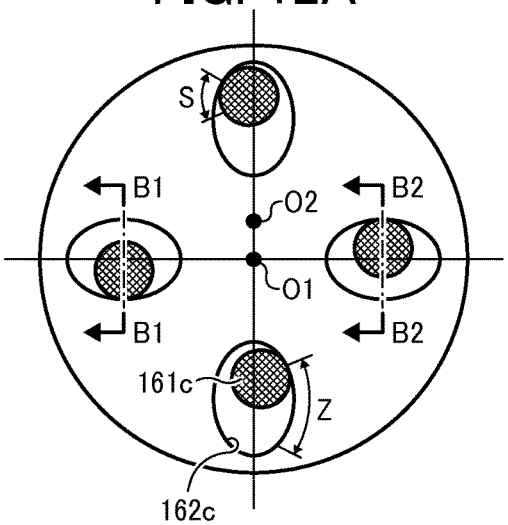
FIGS. 12A through 12C are diagrams illustrating a contact state in which the drive claws contact the claw insertion holes at each position in the rotation direction in a case in which the first coupling is connected to the second coupling with being inclined with respect to the axial direction, according to an example of this disclosure.
Figure 12B:
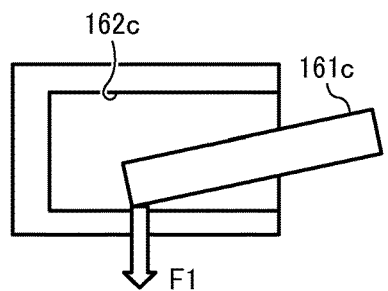
Figure 12C:
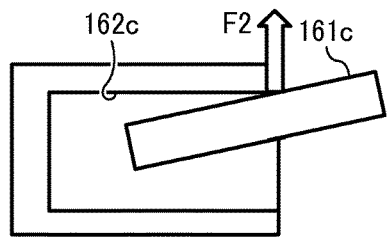

FIGS. 12A through 12C are diagrams illustrating a contact state in which the drive claws 161c contact the respective claw insertion holes 162c at each position in the rotation direction in a case in which the first coupling 161 is connected to the second coupling 162 with being inclined with respect to the axial direction. Specifically, FIG. 12A is a diagram illustrating the contact state of the drive claws 161c and the claw insertion holes 162c. FIG. 12B is a cross sectional view illustrating the contact state of the drive claw 161c and the claw insertion hole 162c along a line B1-B1 of FIG. 12A. FIG. 12C is a cross sectional view illustrating the contact state of the drive claw 161c and the claw insertion hole 162c along a line B2-B2 of FIG. 12A.

If a center O4 of the screw drive shaft 63 is displaced upward from a center O3 of the screw shaft 431b as illustrated in FIG. 12A, the leading end of the drive claw 161c contacts the inner circumferential surface of the claw insertion hole 162c at 90 degrees to the left in FIG. 12A with respect to the axial misalignment direction, as illustrated in FIG. 12B. By contrast, as illustrated in FIG. 12C, a root end side of the drive claw 161c contacts the inner circumferential surface of the claw insertion hole 162c at 90 degrees to the right in FIG. 12A with respect to the axial misalignment direction. It is to be noted that the inner circumferential surface of the claw insertion hole 162c is formed in an arc-shaped concave surface. Therefore, two points (i.e., the leading end and root end sides of the drive claw 161c) contact the inner circumferential surface of the claw insertion hole 162c at a position in the axial misalignment direction.

A drive force is transmitted at the contact portion of the drive claw 161c with the inner circumferential surface of the claw insertion hole 162c. Therefore, as illustrated in FIG. 12B, the drive force is transmitted on the inner side of the claw insertion hole 162c at 90 degrees to the left in FIG. 12A with respect to the axial misalignment direction to press in the second coupling 162 downward in FIG. 12B. In other words, a downward force indicated by arrow F1 illustrated in FIG. 12B is exerted. By contrast, as illustrated in FIG. 12C, the drive force is transmitted on an opening side of the claw insertion hole 162c at 90 degrees to the right in FIG. 12A with respect to the axial misalignment direction to press in the second coupling 162 upward in FIG. 12C. In other words, an upward force indicated by arrow F2 illustrated in FIG. 12C is exerted.

Figure 13:
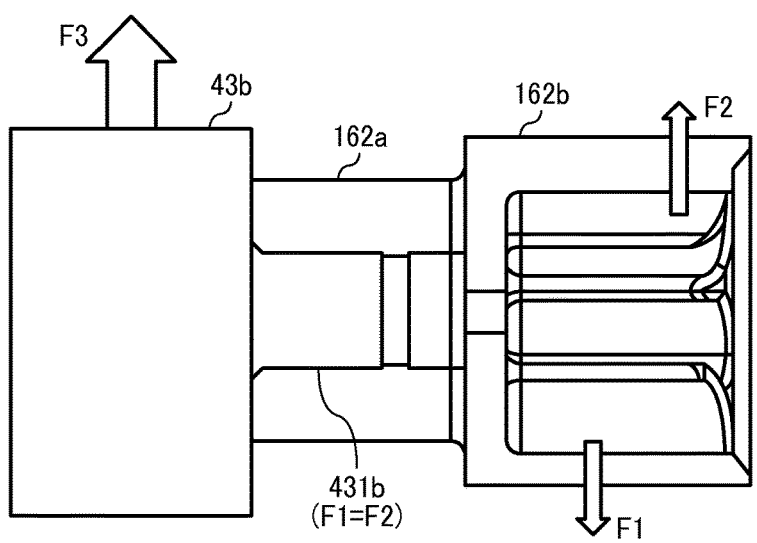
FIG. 13 is a diagram illustrating a case in which the contact parts where the drive claw contacts the claw insertion hole is different in the axial direction.

FIG. 13 is a diagram illustrating a case in which the contact parts where the drive claw 161c contacts the claw insertion hole 162c is different in the axial direction.

According to the principle of leverage, the force on a side away from the shaft fitting portion 162a that functions as the fulcrum is predominant. Therefore, the upward force in FIG. 12A is predominant in the vertical direction (i.e., the axial misalignment direction) in FIG. 12A. As a result, as illustrated in FIG. 13, an upward force indicated by arrow F3 (i.e., in the axial misalignment direction) as illustrated in FIG. 13 is provided to the supply screw 43b that is a target to be driven. By contrast, the position where the drive claw 161c contacts the inner circumferential surface of the claw insertion hole 162c is the same in the axial direction between the upper and lower positions in the vertical direction illustrated in FIG. 12A. Therefore, it is not likely that the downward force F1 and the upward force F2 are cancelled out with each other. Accordingly, the supply screw 43b is not provided with a force in the horizontal direction in FIG. 12A (the direction orthogonal to the axial misalignment direction).

Figure 14:
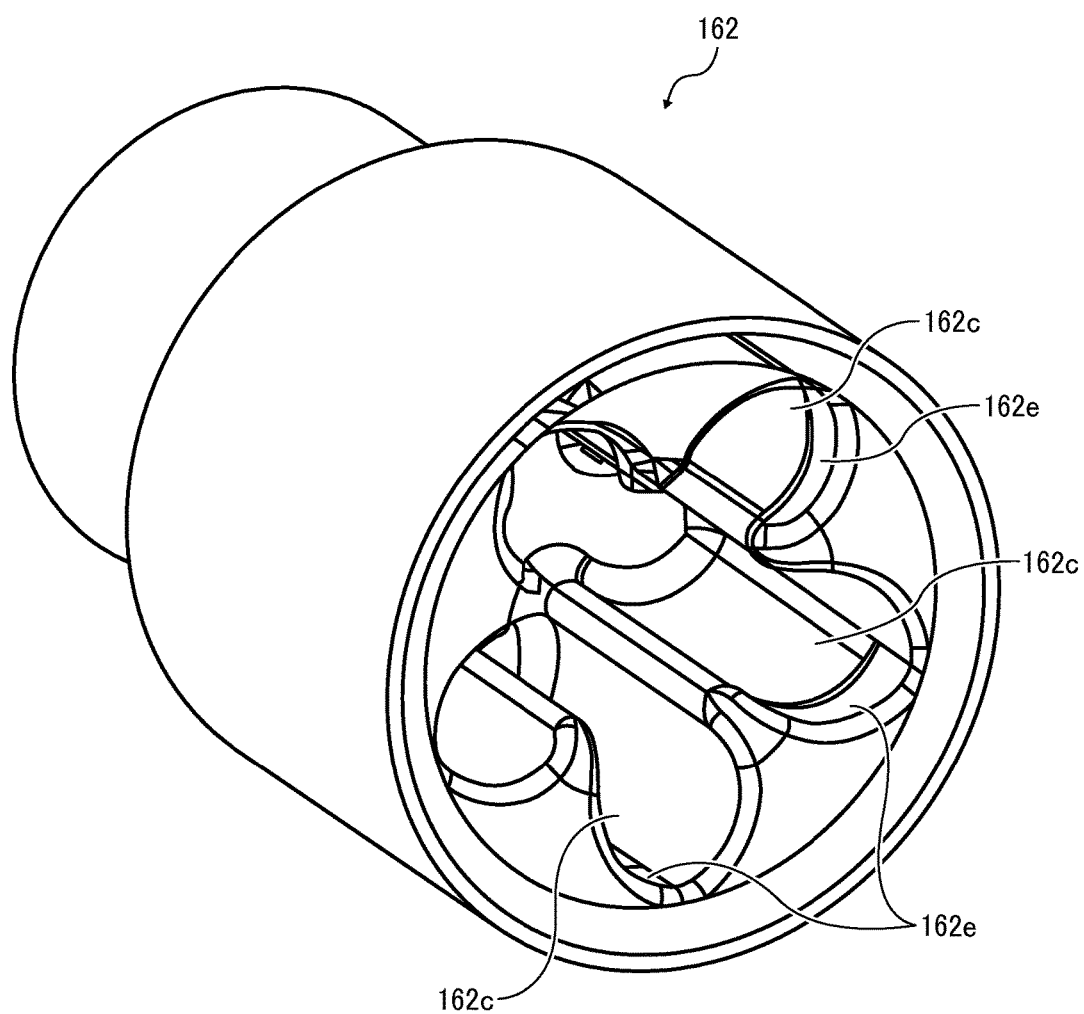
FIG. 14 is a perspective view of the second coupling provided with a projection at an end on an opening side of the claw insertion hole according to the example of this disclosure.
Figure 15:
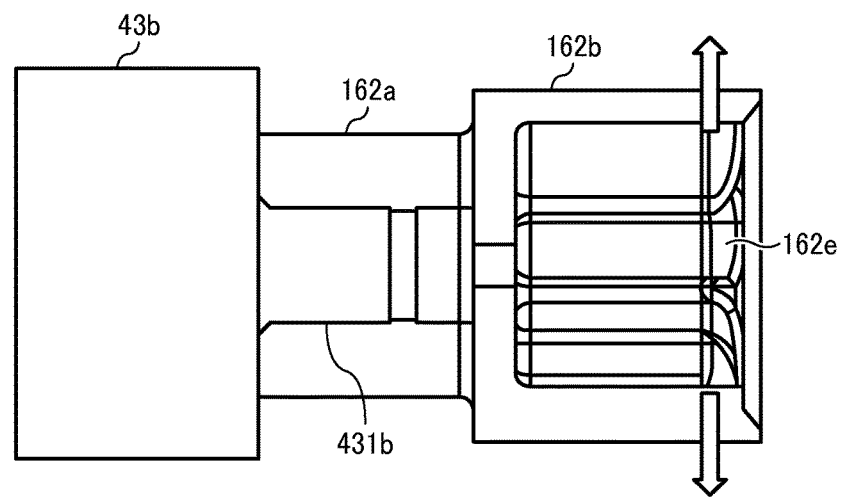
FIG. 15 is a diagram illustrating effects in providing the projection according to the example of this disclosure.

FIG. 14 is a perspective view of the second coupling 162 provided with a projection 162e at an end on an opening side of the claw insertion hole 162c according to the example of this disclosure. FIG. 15 is a diagram illustrating effects in providing the projection 162e according to the example of this disclosure.

When there is the axial misalignment, it is preferable that the configuration illustrated in FIG. 14 is employed in order not to provide a force in the axial misalignment direction to the supply screw 43b. In other words, the projection 162e that protrudes from the inner circumferential surface of the claw insertion hole 162c is provided at an end on the opening side of the inner circumferential surface downstream from the drive claw 161c in the rotation direction upon drive transmission. In other words, the projection 162e is a contact portion where the drive claws 161c contact the second coupler 162. With such a configuration, the drive claw 161c can be brought into contact at any position in the rotation direction with the projection 162e that is provided on the opening side of the claw insertion hole 162c. Consequently, as illustrated in FIG. 15, a drive force is transmitted on the opening side of the claw insertion hole 162c at any position in the rotation direction, thereby preventing forces in directions other than the rotation direction from being provided to the supply screw 43b.

Figure 16A:
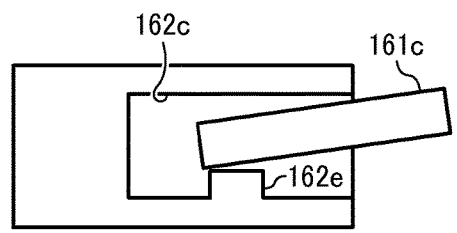
FIGS. 16A and 16B are diagrams illustrating effects in providing the projection at the end on the opening side of the claw insertion hole according to the example of this disclosure.
Figure 16B:
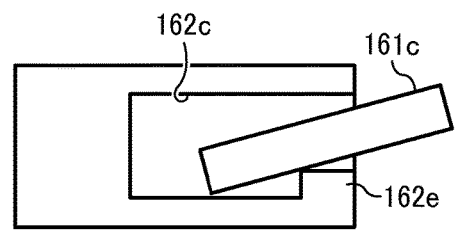

FIGS. 16A and 16B are diagrams illustrating effects in providing the projection 162e at the end on the opening side of the claw insertion hole 162c according to the example of this disclosure.

Further, as illustrated in FIG. 16B, the projection 162e is provided on the opening side of the claw insertion hole 162c. By so doing, a large amount of inclination of the first coupling can be obtained when compared with a case in which the projection 162e is provided inside the claw insertion hole 162c, as illustrated in FIG. 16A. Consequently, the tolerance of axial misalignment can be increased.

Moreover, as previously illustrated in FIG. 12A, when there is the axial misalignment, the drive claw 161c moves in an area Z, as illustrated in FIG. 12A, in the normal direction along the inner circumferential surface of the claw insertion hole 162c upon drive transmission. In the present example, the drive claw 161c is formed in a columnar or cylindrical shape. The surface of the drive claw 161 contacting the inner circumferential surface of the claw insertion hole 162c upon drive transmission is formed in an arc-shaped convex surface. Consequently, the drive claw 161c can move smoothly along the inner circumferential surface of the claw insertion hole 162c. In the present example, the drive claw 161c is formed in a columnar or cylindrical shape. However, the surface that contacts the inner circumferential surface of the claw insertion hole 162c upon drive transmission is simply an arc-shaped convex surface. For example, the drive claw 161c may have a semicircular shape in a cross section. Moreover, in the present example, the drive claw 161c is formed in a columnar or cylindrical shape. However, the shape of the drive claw 161c is not limited thereto. For example, the drive claw 161c may have a tubular shape that is hollow inside. The drive claw 161c is formed in a columnar or tubular shape and its outer circumference is formed in a circle. By so doing, the portion of the arc-shaped convex surface of the drive claw 161c can be brought into contact with the inner circumferential surface of the drive claw 161c in both forward and reverse rotations.

Moreover, in the present example, the inner circumferential surface of the claw insertion hole 162c contacts the drive claw 161c upon drive transmission. The inner circumferential surface of the claw insertion hole 162c is formed in an arc-shaped concave surface that can be inclined with respect to the axial direction. If the inner circumferential surface is a flat surface, when there is the axial misalignment and the drive claw 161c slides along the inner circumferential surface of the claw insertion hole 162c, one point of the drive claw 161c slides along the inner circumferential surface of the claw insertion hole 162c. As a result, it is likely that the wearing due to slide of the drive claw 161c along the inner circumferential surface of the claw insertion hole 162c causes the contact surface of the drive claw 161c with the inner circumferential surface to be a flat surface. By contrast, if the inner circumferential surface of the claw insertion hole 162c is formed in an arc-shaped concave surface, when there is the axial misalignment, the contact position of the drive claw 161c with the contact parts 162h on the inner circumferential surface of the claw insertion hole 162c constantly changes. As a result, the drive claw 161c slides along the contact parts 162h on the inner circumferential surface of the claw insertion hole 162c in the area S illustrated in FIG. 12A. Hence, even if the wearing occurs due to the slide of the drive claw 161c along the inner circumferential surface of the claw insertion hole 162c, the arc-shaped convex surface can be maintained and the drive claw 161c can move smoothly along the inner circumferential surface of the claw insertion hole 162c over time.

Moreover, in the present example, the inner circumferential surfaces of the claw insertion hole 162c on both of one side and the other side in the rotation direction are formed in an arc-shaped concave surface. Consequently, upon both forward rotation and reverse rotations, the drive claw 161c can be brought into contact with the inner circumferential surface of the arc-shaped concave surface of the claw insertion hole 162c. Moreover, if the developing motor 60 is designed to rotate in a single direction, the first coupling 161 also rotates in a single direction, and therefore one side of the inner circumferential surface of the claw insertion hole 162c in the rotation direction may be formed in an arc-shaped concave surface and the other side may be formed in a flat surface.

Moreover, if the developing motor 60 is designed to rotate in a single direction, the first coupling 161 rotates in a single direction. Therefore, a projection may be mounted on the drive claw 161c, so that the supply screw 43b is not provided with a force in the axial misalignment direction.

Figure 17A:
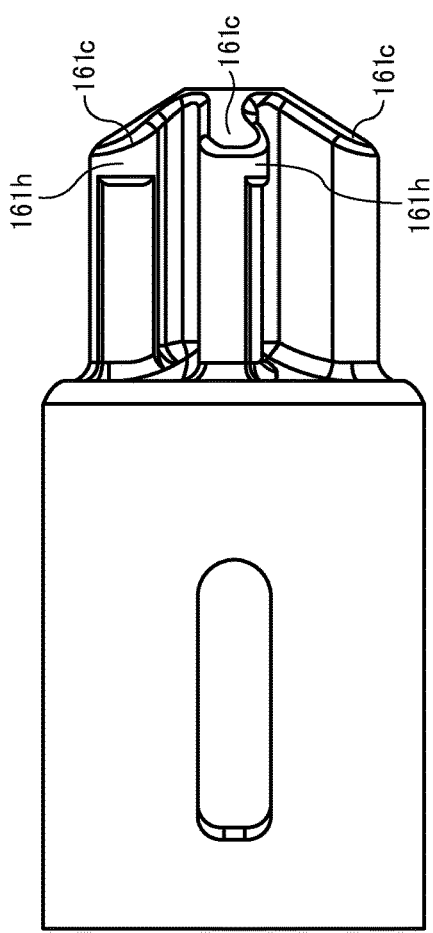
FIGS. 17A and 17B are diagrams illustrating the drive claws provided with the projections.
Figure 17B:
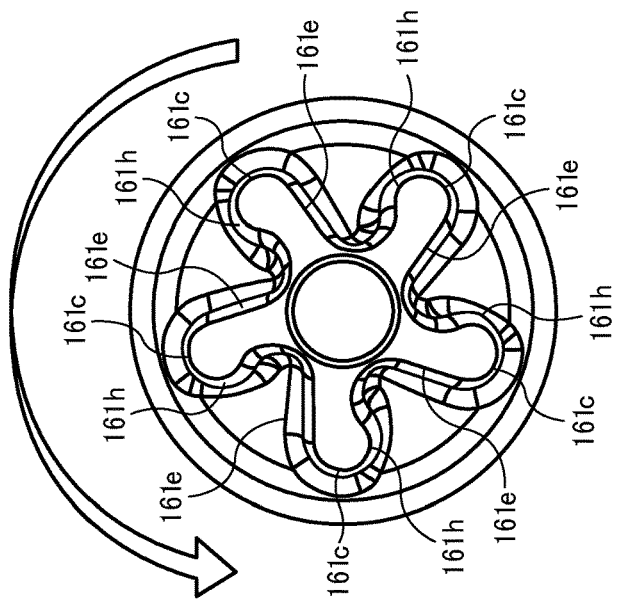
Figure 18A:
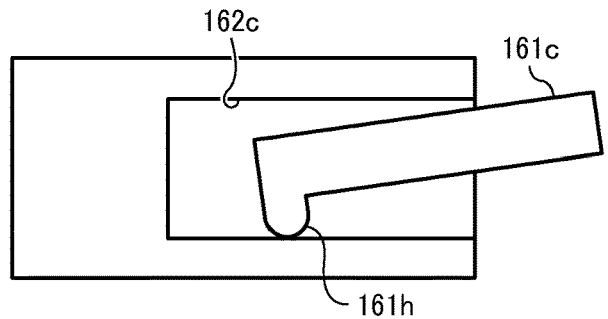
FIGS. 18A and 18B are diagrams illustrating that the projection provided at a leading end of the drive claw of FIGS. 17A and 17B contacts a substantially same position of a claw insertion hole in the axial direction at any position of the rotation direction.
Figure 18B:
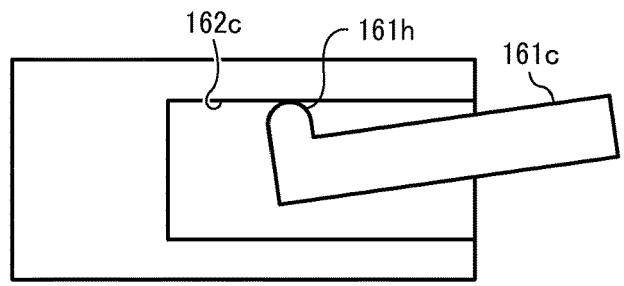
Figure 19:
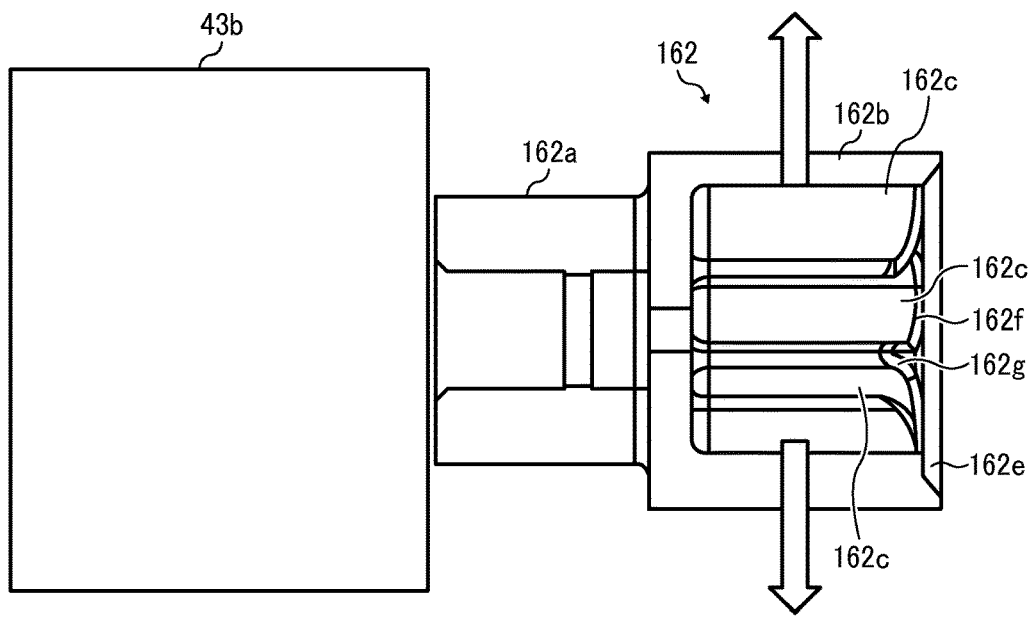
FIG. 19 is a diagram illustrating an effect of a configuration illustrated in FIGS. 17A and 17B.
Figure 20:
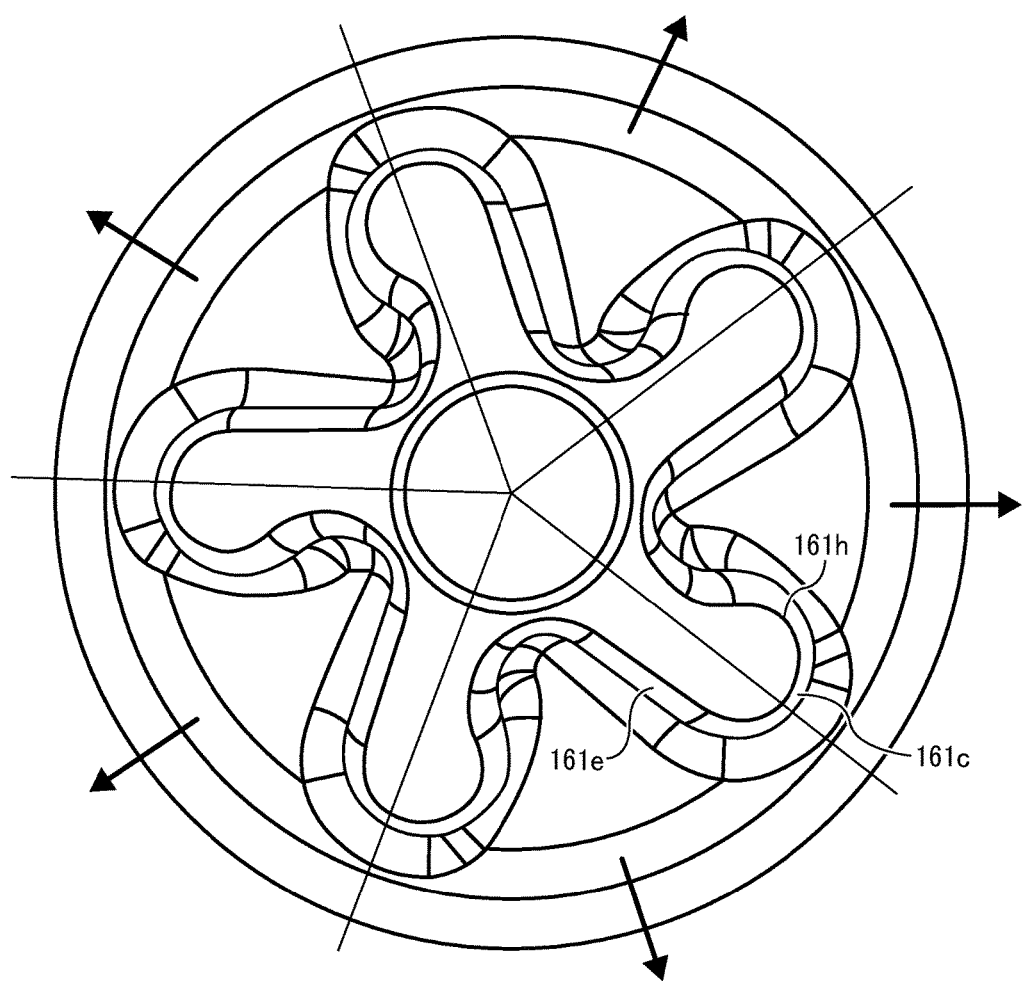
FIG. 20 is a diagram illustrating a mold sliding direction for injection molding of the first coupling of FIGS. 17A and 17B.

FIGS. 17A and 17B are diagrams of the first coupling 161 having projections 161h on the drive claws 161c. FIGS. 18A and 18B are diagrams illustrating that the projection 161h provided at a leading end of the drive claw 161c of FIGS. 17A and 17B contacts a substantially same position of the claw insertion hole 162c in the axial direction at any position of the rotation direction. FIG. 19 is a diagram illustrating an effect of a configuration illustrated in FIGS. 17A and 17B. FIG. 20 is a diagram illustrating a mold sliding direction for injection molding of the first coupling 161 of FIGS. 17A and 17B.

As illustrated in FIGS. 17A and 17B, the first coupling 161 has the projections 161h on the leading end of the drive claws 161c. The configuration illustrated in FIGS. 17A and 17B has the projections 161h on the leading end of the drive claws 161c in a shape cutting each drive claw 161c other than the leading end of the drive claw 161c on a downstream side in the rotation direction. The shape is so formed because the outer diameter of the drive claw 161c cannot be any greater after a reduction in diameter of the first coupling 161.

Since the projections 161h on the leading end of the drive claws 161c are formed in the shape cutting each drive claw 161c other than the leading end of the drive claw 161c on a downstream side in the rotation direction, the strength of the drive claws 161c is decreased. However, if the first coupling 161 is designed to rotate in a single direction, as illustrated in FIG. 8, the thickness of the reinforcing rib 161e on the upstream side in the rotation direction can be increased, and therefore a possible reduction in strength of the drive claw 161c can be reinforced by the reinforcing rib 161e. Even if the configuration in which the first coupling 161 is provided with the projections 161h on the leading end of the drive claws 161c is employed, it is not likely that the shape of the drive claw 161c is deformed.

Thus, even in the configuration in which the first coupling 161 is provided with the projections 161h on the drive claws 161c, the projection 161h on the drive claw 161c can contact the claw insertion hole 162c at a position rotated by 90 degrees with respect to the axial misalignment direction in the rotation direction upon drive transmission, as illustrated in FIG. 18A, and at a position by 90 degrees with respect to the axial misalignment direction in a direction opposite to the rotation direction upon drive transmission, as illustrated in FIG. 18B. Consequently, the projection 161h on the drive claw 161c can contact the claw insertion hole 162c at any position in the rotation direction, and therefore the drive claws 161c contact the inner circumferential surface of the claw insertion holes 162c at a substantially same position in the axial direction. By so doing, as illustrated in FIG. 19, it is not likely that respective drive forces applied from the drive claws 161c to the second coupling 162 are cancelled out with each other. Consequently, the supply screw 43b is not provided with the force in the axial misalignment direction.

Moreover, in the configuration mounting the projections 161h on the drive claws 161c, it is preferable that the first coupling 161 is formed of resin having the flexural modulus greater than the second coupling 162. By so doing, the first coupling 161 having the projection 161h at the leading end of the drive claw 161c can be formed by injection molding, and therefore can be manufactured easily.

In a case in which the first coupling 161 having the projections 161h at the leading end of the drive claws 161c is formed by resin injection molding, five metal molds for forming drive claws 161c. After the drive claws 161c have been formed, the metal molds are slid in respective directions indicated by arrows in FIG. 20. By so doing, the first coupling 161 having the projections 161h at the leading end of the drive claws 161c can be formed by resin injection molding.

Moreover, compared with the configuration illustrated in FIG. 14 in which the projection 162e is provided at the end on the opening side of the claw insertion hole 162c of the second coupling 162, the projection 161h can be located on the drive claw 161c at a higher position. After the second coupling 162 has been formed, the metal mold for forming the claw insertion hole 162c of the second coupling 162 is pulled out from the claw insertion hole 162c of the formed second coupling 162. If the projection 162e is provided at the end on the opening side of the claw insertion hole 162c of the second coupling 162, the metal mold for forming the claw insertion hole 162c is forcibly pulled. In order to enable forced extraction from the metal mold of the claw insertion hole 162c, an amount of projection of the projection 162e from the claw insertion hole 162c cannot be increased.

By contrast, in a case in which the first coupling 161 has the projection 161h mounted on the leading end of the drive claw 161c, the metal mold is slid in a direction indicated by arrow in FIG. 20 after forming the first coupling 161. By sliding the metal mold in the direction indicated by arrow in FIG. 20, the drive claw 161c having the projection 161h at the leading end can be formed. Consequently, even if the projection 161h is high, the first coupling 161 can be molded, and therefore the projection 161h can contact the claw insertion hole 162c of the second coupling 162 reliably.

Figure 21A:
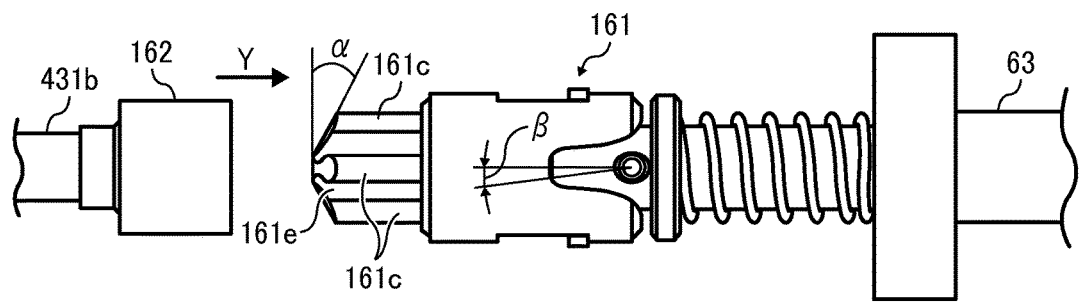
FIGS. 21A through 21C are diagrams illustrating the coupling between a screw drive shaft and a screw shaft by the screw coupling of the example of this disclosure.
Figure 21B:
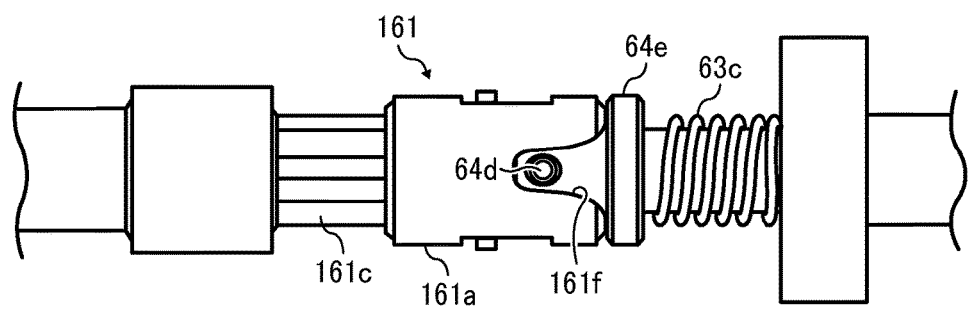
Figure 21C:
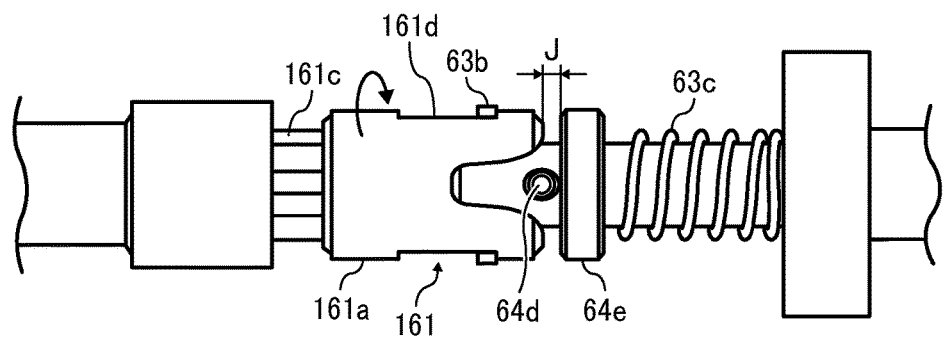

FIGS. 21A through 21C are diagrams illustrating the coupling between the screw drive shaft 63 and the screw shaft 431b by the screw coupling 66 of the present example of this disclosure.

When the process cartridge 40 previously illustrated in FIG. 3 is moved in the axial direction to be inserted to the apparatus body 110 of the image forming apparatus 100, the second coupling 162 that is mounted on the screw shaft 431b moves in a direction indicated by arrow Y in FIG. 21A and approaches the first coupling 161.

In the present example, the rotation center of the reinforcing ribs 161e of the first coupling 161 projects toward the second coupling 162 more than the drive claws 161c. Hence, as the second coupling 162 moves in the direction Y in FIG. 21A, the rotation center of the reinforcing ribs 161e is inserted to the rib insertion hole 162d of the second coupling 162 (see FIG. 10). By so doing, the drive claws 161c can be inserted to the claw insertion holes 162c in a state in which the second coupling 162 has roughly been positioned by the rotation center of the reinforcing ribs 161e. Therefore, insertion of the drive claw 161c to the claw insertion hole 162c can be enhanced.

Moreover, the process cartridge 40 is inserted to the apparatus body 110 of the image forming apparatus 100 with a certain degree of wobble. Hence, the first coupling 161 may be connected to the second coupling 162 in a state in which the positional relation of the first coupling 161 and the second coupling 162 in the normal direction is displaced. In this case, the rotation center of the reinforcing ribs 161e may hit the edge of the rib insertion hole 162d between the claw insertion holes 162c. However, in the present example, as previously illustrated in FIG. 10, the rib guide surface 162g is formed at the edge of the rib insertion hole 162d. The rib guide surface 162g guides the reinforcing ribs 161e to the rib insertion hole 162d. Hence, even if the rotation center of the reinforcing ribs 161e hits the edge of the rib insertion hole 162d, when the process cartridge 40 is continuously moved in the axial direction, the rotation center of the reinforcing ribs 161e is guided to the rib guide surface 162g and inserted to the rib insertion hole 162d. Consequently, even if the first coupling 161 is connected to the second coupling 162 in the state in which the positional relation of the first coupling 161 and the second coupling 162 in the normal direction is displaced in some degree, the rotation center of the reinforcing ribs 161e can be inserted to the rib insertion hole 162d.

Moreover, if the first coupling 161 is connected to the second coupling 162 in the state in which the positional relation of the first coupling 161 and the second coupling 162 in the normal direction is displaced, it is likely that the leading end of the drive claw 161c and the leading end surface of the portion of the reinforcing rib 161e spreading from the drive claw 161c toward the rotation center of the reinforcing rib 161e hits the edge of the claw insertion hole 162c. However, in the present example, the leading end surface of the portion of the reinforcing rib 161e extending from the drive claw 161c toward the rotation center is an inclined surface or a slope formed to decline toward the rotation center as approaching or coming closer to the second coupling 162. Moreover, as previously illustrated in FIG. 10, the claw guide surface 162f is formed at the edge of the claw insertion hole 162c to guide the drive claw 161c to the claw insertion hole 162c. Hence, even if the leading end of the drive claw 161c and the leading end surface of the portion of the reinforcing rib 161e extending from the drive claw 161c toward the rotation center hit the edge of the claw insertion hole 162c, as the process cartridge 40 is continuously moved in the axial direction, the drive claw 161c guided by the claw guide surface 162f and the inclined leading end surface of the reinforcing rib 161e can be inserted to the claw insertion hole 162c.

Moreover, in the screw coupling 66 of the present example, the bearing pin 64d receives the biasing force of the coil spring 63c. Hence, unless the first coupling 161 is pressed in toward the coil spring 63c, the biasing force of the coil spring 63c does not act on the first coupling 161. Therefore, when the drive claws 161c of the first coupling 161 are inserted to the second coupling 162, the first coupling 161 may be inclined under the own weight thereof. In the present example, it is designed such that that the rotation center of the reinforcing ribs 161e is inserted to the second coupling 162 even if the first coupling 161 is inclined under the own weight thereof. Specifically, the inclination angle α of the leading end surface of the portion of the reinforcing rib 161e extending from the drive claw 161c toward the rotation center is made greater than the inclination angle β with respect to the axial direction under the own weight of the first coupling 161. In the present example, the inclination angle β with respect to the axial direction under the own weight of the first coupling 161 is greater than the maximum inclination angle θ that can be taken by the first coupling 161 when the first coupling 161 is connected to the second coupling 162.

With such a configuration, even if the first coupling 161 inclines in the axial direction under the own weight thereof, a leading end 161j of the rotation center part 161g of the reinforcing ribs 161e can be located closer to the second coupling 162 than the leading ends of the drive claws 161c. Consequently, even if the first coupling 161 is inclined under the own weight thereof, the rotation center of the reinforcing ribs 161e can be initially inserted to the rib insertion hole 162d of the second coupling 162. Consequently, even if the first coupling is inclined under the own weight thereof, the drive claws 161c can be inserted to the claw insertion holes 162c in the state in which the second coupling 162 is roughly positioned by the rotation center of the reinforcing ribs 161e. Hence, even in a state in which the first coupling 161 is inclined in the axial direction under the own weight thereof, insertion of the drive claw 161c to the claw insertion hole 162c can be enhanced.

Moreover, it is designed that the first coupling 161 inclined under the own weight thereof can be inserted to the second coupling 162 even in a state in which downward axial misalignment with respect to the screw shaft 431b occurs in the screw drive shaft 63 on which the first coupling 161 is mounted. Specifically, it is so designed that, in the above-described state, the leading end of the drive claw 161c is located on the inner side than the outer circumference of the second coupling 162 and more than a half of the rotation center part 161g of the reinforcing ribs 161e faces the rib insertion hole 162d. Consequently, when the first coupling 161 inclined under the own weight thereof is inserted to the second coupling 162 in the above-described state, the rotation center part 161g of the reinforcing ribs 161e can be inserted to the rib insertion hole 162d, and the drive claws 161c can be inserted to the claw insertion holes 162c.

Moreover, there are the following effects by designing the inclination angle α of the leading end surface of the portion of the reinforcing rib 161e extending from the drive claw 161c toward the rotation center to be greater than the inclination angle β under the own weight of the first coupling 161. In other words, even when the first coupling 161 inclines under the own weight thereof, the leading end surface of the reinforcing rib 161e at the portion extending from the drive claw 161c toward the rotation center can be inclined with respect to the direction orthogonal to the axis. Consequently, even when the first coupling 161 inclines under the own weight thereof, the drive claw 161c can be guided to the claw insertion hole 162c with the leading end surface of the reinforcing rib 161e at the portion from the drive claw 161c toward the rotation center.

When the drive claw 161c is continuously inserted to the claw insertion hole 162c, the inclination angle of the first coupling 161 is gradually reduced, resulting in an inclination angle corresponding to the axial misalignment.

If the phase difference in the rotation direction between the drive claw 161c and the claw insertion hole 162c is small, the claw guide surface 162f formed at the edge of the claw insertion hole 162c can guide the drive claw 161c to insert the drive claw 161c to the claw insertion hole 162c. However, if the phase difference in the rotation direction between the drive claw 161c and the claw insertion hole 162c is large, for example, in a case in which the drive claw 161c is located in the middle between the claw insertion holes 162c, the drive claw 161c does not enter the claw insertion hole 162c in the mounting operation of the process cartridge 40. In this case, as illustrated in FIG. 21B, the first coupling 161 is pressed to the second coupling 162. Then, the first coupling 161 contacts the intermediate member 64e, and then moves to the right in FIG. 21B together with the intermediate member 64e while compressing the coil spring 63c. Since the bearing pin escape 161f is formed in the first coupling 161, the first coupling 161 can be moved in the axial direction without movement of the first coupling 161 in the axial direction being stopped by contacting the bearing pin 64d.

As described above, also in the present example, if the drive claws 161c do not enter the claw insertion holes 162c in the mounting operation of the process cartridge 40, the first coupling 161 moves in the axial direction, thereby mounting the process cartridge 40. Moreover, if the drive claws 161c do not enter the claw insertion holes 162c in the mounting operation of the process cartridge 40, the first coupling 161 moves in the axial direction to escape, and therefore the coupling can be prevented from being damaged or broken.

After the process cartridge 40 has been mounted, the developing motor 60 is rotated to rotate the first coupling 161. By so doing, the phases of the drive claws 161c and the claw insertion holes 162c are aligned. As illustrated in FIG. 21C, the biasing force of the coil spring 63c moves the first coupling 161 and the intermediate member 64e toward the second coupling 162. The drive claws 161c then enter the claw insertion holes 162c. In other words, the first coupling 161 is located at a drive transmitting position. Consequently, the screw drive shaft 63 is coupled to the screw shaft 431b to rotate the screw shaft 431b. Moreover, after the intermediate member 64e has hit the bearing pin 64d and the drive claws 161c have entered the claw insertion holes 162c, the biasing force of the coil spring 63c does not act on the first coupling 161.

Moreover, as illustrated in FIG. 21C, when the pin 63b is in contact with an end of the pin fitting hole 161d on a side of the coil spring 63c, there is a clearance J between the intermediate member 64e and the first coupling 161. Hence, the first coupling 161 can be inclined without pressing in the coil spring 63c via the intermediate member 64e. Consequently, even if there is the axial misalignment, the first coupling 161 inclines smoothly and can be connected to the second coupling 162.

Moreover, even if the first coupling 161 is inclined due to the axial misalignment and is coupled with the second coupling 162, such a biasing force of the coil spring 63c as to stop the inclination of the first coupling 161 is not generated. Hence, the screw shaft 431b and the screw drive shaft 63 are prevented from warping under the biasing force of the coil spring 63c, and the axial reaction force is prevented from occurring.

Figure 22:
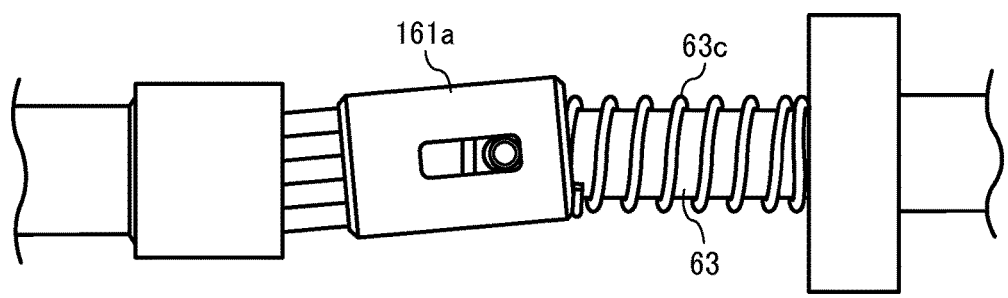
FIG. 22 is a diagram illustrating a case in which a bearing pin and an intermediate member are not provided according to an example of this disclosure.
Figure 23:
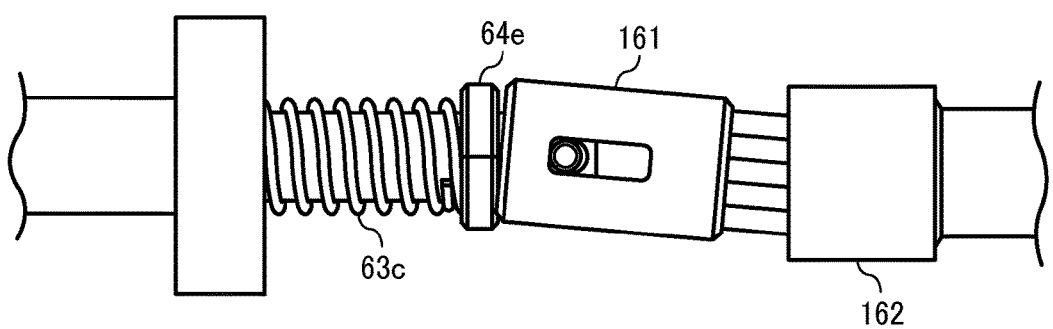
FIG. 23 is a diagram illustrating a case in which the bearing pin is not provided according to an example of this disclosure.
Figure 24A:
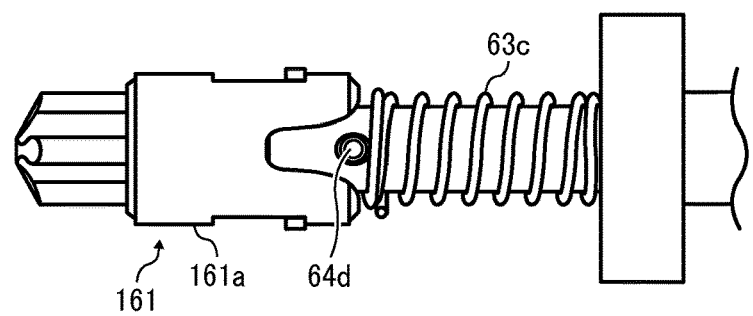
FIGS. 24A through 24C are diagrams illustrating a case in which the intermediate member is not provided according to an example of this disclosure.
Figure 24B:
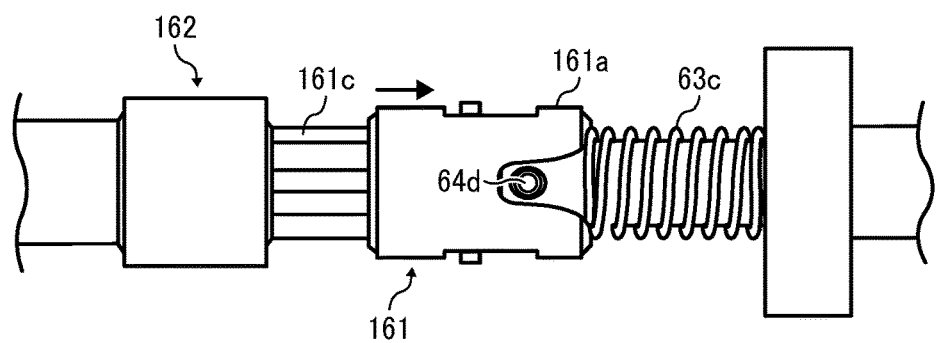
Figure 24C:
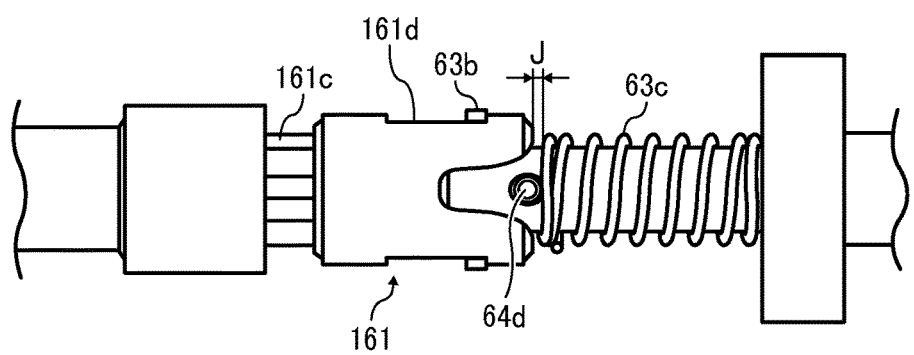

FIG. 22 is a diagram illustrating a case in which a bearing pin and an intermediate member are not provided according to an example of this disclosure. FIG. 23 is a diagram illustrating a case in which the bearing pin is not provided according to an example of this disclosure. FIGS. 24A through 24C are diagrams illustrating a case in which the intermediate member is not provided according to an example of this disclosure.

A spring pin or parallel pin can be applied to the bearing pin 64d that receives the biasing force of the coil spring 63c. Spring pins are less expensive than parallel pins. By using the spring pin as the bearing pin 64d, a reduction in cost of the image forming apparatus 100 can be achieved. By contrast, the parallel pin has higher axial precision than the spring pin. Hence, by using the parallel pin as the bearing pin 64d, accuracy in the clearance J between the intermediate member 64e and the first coupling 161 can be enhanced. Consequently, when the first coupling 161 is inclined, the parallel pin can restrain the contact of the first coupling 161 to the intermediate member 64e as compared to the case in which the spring pin is used.

Moreover, in the present example, the following effects can be obtained by providing the intermediate member 64e, the first coupling 161 can compress the coil spring 63c via the intermediate member 64e. In other words, if the intermediate member 64e is not provided, an end of the shaft insertion portion 161a of the first coupling 161 contacts the coil spring 63c to compress the coil spring 63c. The inner diameter D2 of the shaft insertion portion 161a is greater than the outer diameter D3 of the screw drive shaft 63. There is a predetermined clearance between the shaft insertion portion 161a and the screw drive shaft 63. As a result, if the end of the shaft insertion portion 161a of the first coupling 161 directly compresses the coil spring 63c, it is likely that the coil spring 63c enters the clearance between the shaft insertion portion 161a and the screw drive shaft 63, as illustrated in FIG. 22. Consequently, it is likely that the first coupling 161 does not move in the axial direction by being caught on the coil spring 63c that has entered the clearance between the shaft insertion portion 161a and the screw drive shaft 63. As a result, even if the phases of the drive claws 161c and the claw insertion holes 162c are aligned, it is likely that the drive claws 161c does not enter the claw insertion holes 162c.

By contrast, in the present example, by providing the intermediate member 64e, the coil spring 63c is prevented from entering the clearance between the shaft insertion portion 161a and the screw drive shaft 63. Specifically, in the present example, the clearance between the intermediate member 64e and the screw drive shaft 63 is made smaller than the diameter of the metal wire forming the coil spring 63c. Consequently, the coil spring 63c does not enter the clearance between the intermediate member 64e and the screw drive shaft 63, and it is not likely to occur that the coil spring 63c passes through the clearance and eventually enters the clearance between the shaft insertion portion 161a and the screw drive shaft 63. Hence, when the phases of the drive claws 161c and the claw insertion holes 162c are aligned, the first coupling 161 can be moved in the axial direction to cause the drive claws 161c to enter the claw insertion holes 162c reliably.

Moreover, it is preferable that the intermediate member 64e is formed of resin. If the intermediate member 64e is made of metal, the intermediate member 64e made of metallic material contacts the first coupling 161 made of metal material. As a result, when the first coupling 161 contacts the intermediate member 64e, an abnormal noise such as metallic sound may occur, or scraping may occur. If the intermediate member 64e is made of resin, an abnormal noise or scraping can be prevented when the first coupling 161 contacts the intermediate member 64e.

Moreover, depending on the configuration of the image forming apparatus 100, the bearing pin 64d may be removed as illustrated in FIG. 23 or the intermediate member 64e may be removed as illustrated in FIGS. 24A through 24C. For example, as illustrated in FIG. 23, in a configuration in which the coil spring 63c is hardly compressed even when the first coupling 161 is inclined, and the biasing force is hardly generated even when the first coupling 161 is inclined, the bearing pin 64d may be eliminated.

Moreover, the intermediate member 64e may be eliminated, for example, in a configuration in which the coil spring 63c does not enter the clearance between the shaft insertion portion 161a and the screw drive shaft 63 due to a design that the diameter of the metal wire forming the coil spring 63c is greater than the clearance between the shaft insertion portion 161a and the screw drive shaft 63. In this case, as illustrated in FIG. 24B, when the drive claws 161c do not enter the claw insertion holes 162c and the second coupling 162 presses in the axial direction, the end of the shaft insertion portion 161a contacts the coil spring 63c. The first coupling 161 then moves in the axial direction while compressing the coil spring 63c. When the phases of the drive claws 161c and the claw insertion holes 162c are aligned, the biasing force of the coil spring 63c moves the first coupling 161 toward the second coupling 162. The drive claws 161c enter the claw insertion holes 162c for coupling.

Moreover, as illustrated in FIG. 24C, when the pin 63b is in contact with the end on the coil spring side of the pin fitting hole 161d, there is the clearance J between the coil spring 63c and the first coupling 161. As a result, the first coupling 161 is inclined without pressing in the coil spring 63c. Consequently, even if there is the axial misalignment, the first coupling 161 can be smoothly inclined and connected to the second coupling 162.

Moreover, even if the first coupling 161 is inclined due to the axial misalignment and connected to the second coupling 162, such a biasing force of the coil spring 63c as to stop inclination of the first coupling 161 is not generated. Hence, the screw shaft 431b and the screw drive shaft 63 are prevented from warping under the biasing force of the coil spring 63c, and the axial reaction force is prevented from occurring.

Moreover, the intermediate member 64e is abutted against the pin 63b that is used to transmit a drive force from the screw drive shaft 63 to the first coupling 161. With this configuration, the bearing pin 64d may not be provided.

Figure 25A:
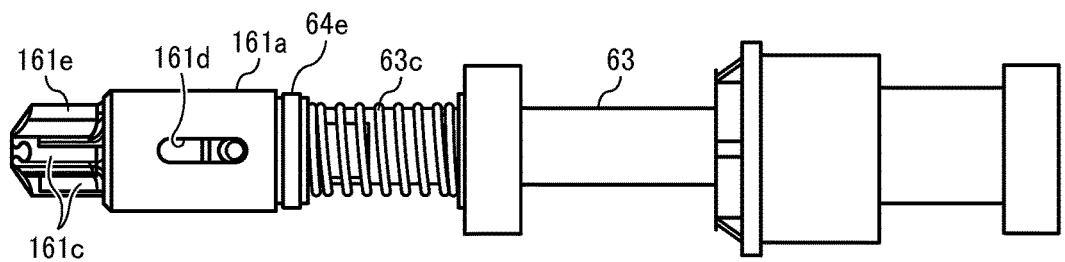
FIG. 25A is a diagram illustrating the first coupling in which the intermediate member is abutted against the pin.
Figure 25B:
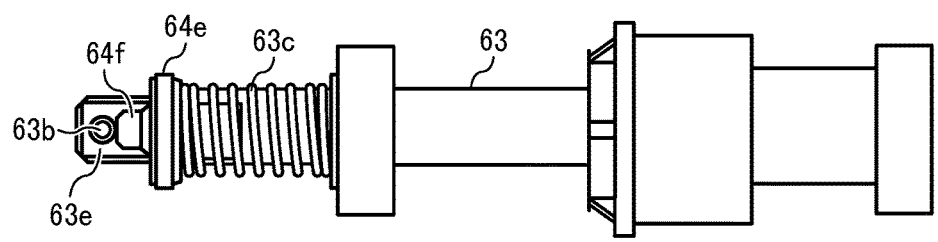
FIG. 25B is a diagram illustrating a state in which the first coupling is removed from FIG. 25A.
Figure 25C:
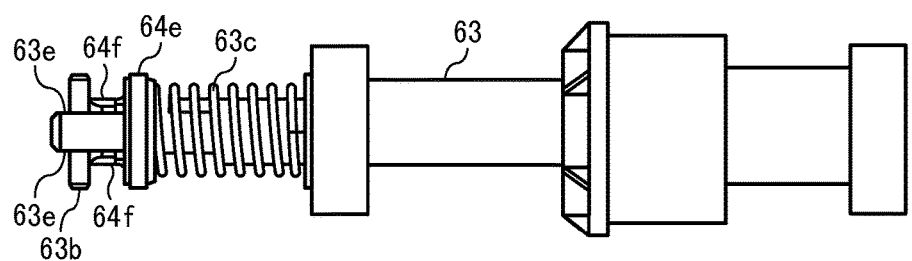
FIG. 25C is a top view of the screw drive shaft, the intermediate member, and other related members of FIG. 25B.

FIG. 25A is a diagram illustrating the first coupling 161 in which the intermediate member 64e is abutted against the pin 63b. FIG. 25B is a diagram illustrating a state in which the first coupling 161 is removed from FIG. 25A. FIG. 25C is a top view of the screw drive shaft 63, the intermediate member 64e, and other related members of FIG. 25B.

As illustrated in FIGS. 25B and 25C, two parts at the leading end of the screw drive shaft 63 are cut, so that the cross section shape of the screw drive shaft 63 is formed in an elliptical shape having a linear part and an arc part. The pin 63b is inserted to the screw drive shaft 63 in a direction perpendicular to a plane 63e formed by cutting the leading end of the screw drive shaft 63.

The intermediate member 64e includes a contact portion 64f that extends in the axial direction and abuts against the pin 63b. The contact portion 64f extends along the plane 63e formed by cutting the leading end of the screw drive shaft 63, so that the contact portion 64f fits to a projected plane of the screw drive shaft 63 when viewed from the axial direction. Consequently, a clearance is formed between the inner circumferential surface of the shaft insertion portion 161a and the contact portion 64f, which is substantially same in size as the clearance between the shaft insertion portion 161a and the screw drive shaft 63. Consequently, the contact portion 64f can swing in a direction parallel to the pin 63b of the first coupling 161.

Thus, since the contact portion 64f mounted on the intermediate member 64e abuts against the pin 63b, a biasing force applied by the coil spring 63c does not act on the first coupling 161 after the drive claw 161c is inserted to the claw insertion hole 162c.

Moreover, the configuration illustrated in FIGS. 25A through 25C can be operated without the bearing pin 64d, and therefore the number of parts can be reduced, resulting in a reduction in cost of the image forming apparatus 100.

Further, a process to press and fit the bearing pin 64d to the screw drive shaft 63 can be omitted, and therefore the number of assembly manpower can be reduced, resulting in a reduction of manufacturing cost of the image forming apparatus 100.

Furthermore, the first coupling 161 can do without the bearing pin escape 161f that is cut in the axial direction, and therefore the strength of the first coupling 161 can be increased.

Moreover, since the bearing pin escape 161f that is cut in the axial direction is not formed on the first coupling 161, the first coupling 161 can be easily formed by resin injection molding.

Moreover, in the above-described description, the first coupling 161 can be inclined with respect to the axial direction. However, the second coupling 162 may be inclinable with respect to the axial direction or both the first coupling 161 and the second coupling 162 may be inclinable with respect to the axial direction. Further, the second coupling 162 may be mounted on the screw drive shaft 63 and the first coupling 161 on the screw shaft 431b.

Moreover, the developing coupling 65 that couples the developing drive shaft 61 to the developing roller shaft 431a may be a coupling with the same configuration as the screw coupling 66. Moreover, the photoconductor coupling 72 that couples the output shaft 71a to the photoconductor shaft 41a may be coupling with the same configuration as the screw coupling 66. Furthermore, a coupling with the same configuration as the screw coupling 66 may be used for coupling a shaft of the lubricant coating brush 45a to a shaft on the drive side and for coupling a shaft on the belt drive motor side that drives the intermediate transfer belt 11 to a shaft of the drive roller 15 (FIG. 1). Moreover, a coupling with the same configuration as the screw coupling 66 may be used for coupling a shaft of the primary transfer roller 46, the secondary transfer roller 22, a drive roller of the fixing belt 26, the fixing pressure roller 27, the charging roller 42a, or the like to a shaft on the drive side.

The configurations according to the above-described embodiment are examples. This disclosure can achieve the following aspects effectively.

Aspect 1.

A drive transmitter (for example, the drive transmitter 50) includes a first coupler (for example, the first coupling 161), a second coupler (for example, the second coupling 162), and reinforcing ribs (for example, the reinforcing ribs 161e). The first coupler is mounted on an axial end of a first rotary shaft (for example, the screw drive shaft 63) and is provided with extensions (for example, the drive claws 161c). The extensions extend in an axial direction of the first coupler and are arranged at intervals in a rotation direction of the first coupler. The second coupler is mounted on an axial end of a second rotary shaft (for example, the screw shaft 431b) and is provided with contact parts (for example, the contact parts 162h on the inner circumferential surface of the claw insertion hole 162c of the second coupling 162). The respective extensions contact the contact parts between the first rotary shaft and the second rotary shaft upon drive transmission. The reinforcing ribs are provided to the respective extensions and reinforce the respective extensions.

According to Aspect 1, the extensions are reinforced with the reinforcing ribs. Therefore, even if the outer diameter of each of the extensions becomes smaller due to a reduction in the outer diameter of the coupling, the strength of the extensions can be maintained. Consequently, even if the outer dimension of the coupling is reduced and the outer diameter of the extensions are also decreased, the extensions can be prevented from being bent or broken upon drive transmission. As a result, the drive transmitter can be disposed in a narrow space and the sufficient strength of the extension can be obtained.

Aspect 2.

In Aspect 1, the reinforcing ribs (for example, the reinforcing ribs 161e) of the respective extensions (for example, the drive claws 161c) are coupled with each other.

Consequently, as described in the examples above, the extensions are coupled via the reinforcing ribs, and therefore can be further reinforced.

Aspect 3.

In Aspect 1 or Aspect 2, the reinforcing ribs (for example, the reinforcing ribs 161e) extend from the respective extensions (for example, the drive claws 161c) toward a center of rotation of the first coupler (for example, the first coupling 161) and are coupled at the center of rotation.

Consequently, when the first coupler is rotated in a forward direction and a reverse direction, the reinforcing ribs can be coupled without contacting the contact parts (for example, the contact parts 162h on the inner circumferential surface of the claw insertion hole 162c of the second coupling 162 in the above-described examples).

Aspect 4.

In any one of Aspect 1 through Aspect 3, the reinforcing ribs (for example, the reinforcing ribs 161e) are coupled to the respective extensions (for example, the drive claws 161c) such that the reinforcing ribs do not contact the respective contact parts (for example, the contact parts 162h on the inner circumferential surface of the claw insertion hole 162c of the second coupling 162 in the above-described examples).

Consequently, the extensions can contact the contact parts reliably.

Aspect 5.

In any of Aspect 1 through Aspect 4, each coupling portion provided between the reinforcing ribs (for example, the reinforcing ribs 161e) and the respective extensions (for example, the drive claws 161c) is formed in an R shape.

Consequently, as described in the exampled above, the strength of the coupling portion of the reinforcing ribs and the extensions where stress is concentrated can be increased, and therefore the coupling portion can be prevented from being damaged or broken.

Aspect 6.

In Aspect 5, an end (for example, the end R1 illustrated in FIG. 7) of the R shape on a side of the extensions (for example, the drive claws 161c) is located closer to a center of rotation of the first coupler (for example, the first coupling 161) than a drive coupling circle (for example, the drive coupling circle E) that links respective centers of the extensions.

Consequently, as described in the examples above, the reinforcing ribs (for example, the reinforcing ribs 161e) is prevented from contacting the contact parts (for example, the contact parts 162h on the inner circumferential surface of the claw insertion hole 162c of the second coupling 162 in the above-described examples) upon drive transmission and the extensions can contact the contact parts reliably.

Aspect 7.

In any of Aspect 1 through Aspect 6, at least one of the first coupler (for example, the first coupling 161) and the second coupler (for example, the second coupling 162) is mounted on a corresponding one of the first rotary shaft (for example, the screw drive shaft 63) and the second rotary shaft (for example, the screw shaft 431b) swingably by a given angle with respect to the axial direction thereof. Each surface of the extensions (for example, the drive claws 161c) contacting the contact parts (for example, the contact parts 162h on the inner circumferential surface of the claw insertion hole 162c of the second coupling 162 in the above-described examples) upon drive transmission and the contact parts are formed in an arc shape.

Consequently, as described in the examples above, if there is axial misalignment between the first rotary shaft (for example, the screw drive shaft 63) and the second rotary shaft (for example, the screw shaft 431b), one of the first coupler and the second coupler is coupled in a state while inclined with respect to the axial direction. At this time, the extensions slide along the contact parts. At this time, by forming the surfaces of the extensions contacting the contact parts upon drive transmission to an arc shape, the extensions can slide on the contact parts smoothly.

Moreover, the contact parts are formed in an arc shape. Therefore, as described in the examples above, when the extensions slides along the contact parts, the contact position of the extensions with the contact parts can be changed, thereby preventing occurrence of wearing or abrasion at one point of each of the extensions. Consequently, the arc shape of a claw of the extensions can be maintained over time, and therefore the extensions can slide smoothly along the contact parts over time.

Aspect 8.

In Aspect 1 through Aspect 7, the first coupler (for example, the first coupling 161) of the drive transmitter (for example, the drive transmitter 50) includes at least three extensions (for example, the drive claws 161c).

Consequently, as described in the examples above, when compared with a case in which the first coupler includes two extensions, the drive torque that is applied to the extensions can be reduced and the extensions can be prevented from being broken and deformed. Moreover, the contact pressure applied between each of the extensions and a corresponding one of the contact parts (for example, the contact parts 162h on the inner circumferential surface of the claw insertion hole 162c of the second coupling 162 in the above-described examples), and therefore the frictional force between each of the extensions and the corresponding one of the contact parts can be reduced. Consequently, if there is axial misalignment, the extensions can slide along the contact parts smoothly.

Aspect 9.

In any of Aspect 1 through Aspect 8, the second coupler (for example, the second coupling 162) includes extension insertion holes (for example, the claw insertion holes 162c) and a rib insertion hole (for example, the rib insertion hole 162d). The extensions (for example, the drive claws 161c) are inserted to the extension insertion holes. The reinforcing ribs (for example, the reinforcing ribs 161e) are inserted to the rib insertion hole. The reinforcing ribs of the extensions extend from their respective extensions toward the center of rotation of the first coupler (for example, the first coupling 161) and are coupled at the center of rotation. A rotation center part (for example, the rotation center part 161g) of the reinforcing ribs projects closer to the second coupler than the extensions.

Consequently, as described in the examples above, when the first coupler is connected to the second coupler, the rotation center part of the reinforcing ribs is inserted to the rib insertion hole of the second coupler. Therefore, the extensions can be inserted to the extension insertion holes in a state in which the second coupler is roughly positioned by the rotation center part of the reinforcing ribs. As a result, insertion of the extensions to the extension insertion holes can be enhanced.

Aspect 10.

In Aspect 9, the first coupler (for example, the first coupling 161) is mounted on the first rotary shaft (for example, the screw drive shaft 63) swingably by a given angle with respect to the axial direction of the first coupler. When the first coupler inclines in the axial direction under the own weight thereof, a leading end (for example, the leading end 161j) of the rotation center part (for example, the rotation center part 161g) of the reinforcing ribs (for example, the reinforcing ribs 161e) is located closer to the second coupler (for example, the second coupling 162) than the leading ends of the extensions (for example, the drive claws 161c).

Consequently, as described in the examples above, even when the first coupler inclines under the own weight, the rotation center part of the reinforcing ribs can be inserted to the rib insertion hole (for example, the rib insertion hole 162d), and therefore the effects described in Aspect 8 can be obtained.

Aspect 11.

In any of Aspect 1 through Aspect 10, the second coupler (for example, the second coupling 162) is formed of resin and the first coupler (for example, the first coupling 161) is formed of either one of metal and resin having a flexural modulus greater than the second coupler.

Consequently, as described in the example above, the strength of the first coupler can be increased, and the extensions (for example, the drive claws 161c) can be prevented from being broken and deformed. Moreover, the second coupler can be manufactured at low cost.

Aspect 12.

In any of Aspect 1 through Aspect 11, at least one of the first coupler (for example, the first coupling 161) and the second coupler (for example, the second coupling 162) is mounted on a corresponding one of the first rotary shaft (for example, the screw drive shaft 63) and the second rotary shaft (for example, the screw shaft 431b) swingably by a given angle with respect to the axial direction. The second coupler has extension insertion holes (for example, the claw insertion holes 162c) to which the extensions (for example, the drive claws 161c) are inserted. Projections (for example, the projections 162e) provided on an opening side of each of the extension insertion holes such that each of the extensions contacts the projections.

Consequently, as described in the examples above, even if the first coupler is connected in a state in which the first coupler is inclined with respect to the second coupler, a contact portion where the extensions contact the second coupler can be located on the opening side of the extension insertion holes (for example, the claw insertion holes 162c). Therefore, a drive force can be transmitted on the opening side of the extension insertion holes at any position in the rotation direction. Consequently, forces in directions other than the rotation direction can be prevented from being provided to a supply and transport member (for example, the supply screw 43b).

Aspect 13.

In any of Aspect 1 through Aspect 11, at least one of the first coupler (for example, the first coupling 161) and the second coupler (for example, the second coupling 162) is mounted on a corresponding one of the first rotary shaft (for example, the screw drive shaft 63) and the second rotary shaft (for example, the screw shaft 431b) swingably by a given angle with respect to the axial direction. The first coupler includes projections (for example, the projections 161h) at a leading end of each of the extensions (for example, the drive claws 161c). Each of the projections projects in the rotation direction and contacts a corresponding one of the contact parts (for example, the contact parts 162h on the inner circumferential surface of the claw insertion hole 162c of the second coupling 162) of the second coupler.

Consequently, as described in the example above with FIGS. 8, 17A, 17B, 18A, 18B, 19, and 20, even if the first coupler is coupled with the second coupler in a state in which the first coupler is inclined with respect to the second coupler, the projections provided at the leading end of the extensions can contact the contact parts. Therefore, a drive force can be transmitted at the leading end of the extensions at any position in the rotation direction. Consequently, forces in directions other than the rotation direction can be prevented from being provided to a supply and transport member (for example, the supply screw 43b). Consequently, forces in directions other than the rotation direction can be prevented from being provided to a supply and transport member (for example, the supply screw 43b).

Moreover, when compared with the configuration in which the projections (for example, the projections 162e) are provided at the end on the opening side of the extension insertion holes (for example, the claw insertion holes 162c) of the second coupler, if each of the first coupler and the second coupler is formed by injection molding, the projection (for example, the projections 161h) can be located at a higher position. Consequently, the projection (the projections 161h) can contact the contact parts reliably.

Aspect 14.

In any of Aspect 1 through Aspect 13, the reinforcing ribs (for example, the reinforcing ribs 161e) extend from the respective extensions (for example, the drive claws 161c) toward a center of rotation of the first coupler (for example, the first coupling 161) and are coupled at the center of rotation. When viewing the first coupler in the axial direction, based on a line segment (for example, the line segment LS) connecting a center of each of the extensions and the center of rotation of the first coupler, a thickness of each of the reinforcing ribs on an upstream side in the rotation direction of the reinforcing ribs upon drive transmission is greater than a thickness of the reinforcing ribs on a downstream side in the rotation direction thereof.

Consequently, as described in the example above with FIG. 8, since the thickness of the reinforcing ribs (for example, the reinforcing ribs 161e) on the downstream side in the rotation direction is made thinner than the thickness of the reinforcing ribs on the upstream side in the rotation direction upon drive transmission, the reinforcing ribs can be located more upstream in the rotation direction than the end of the extensions on the downstream side in the rotation direction. Therefore, the extensions can contact the contact parts (for example, the contact parts 162h on the inner circumferential surface of the claw insertion hole 162c of the second coupling 162) reliably. Moreover, by forming the thickness of the reinforcing ribs on the upstream side in the rotation direction greater than the thickness thereof on the downstream side in the rotation direction, when compared with a case in which the thickness of the reinforcing ribs on the upstream side in the rotation direction is equal to the thickness thereof on the downstream side in the rotation direction, the strength of the reinforcing ribs can be increased, thereby reinforcing the extensions preferably.

Aspect 15.

In any of Aspect 1 through Aspect 14, at least one of the first coupler (for example, the first coupling 161) and the second coupler (for example, the second coupling 162) is mounted on a corresponding one of the first rotary shaft (for example, the screw drive shaft 63) and the second rotary shaft (for example, the screw shaft 431b) swingably by a given angle with respect to the axial direction. The second coupler includes extension insertion holes (for example, the claw insertion holes 162c) to which the extensions (for example, the drive claws 161c) are inserted. A length of the extension insertion holes in the rotation direction is shorter than a length extension insertion holes in a normal direction.

Consequently, as described in the examples above, when compared to a case in which the extension insertion holes are round holes and the length of the extension insertion holes is the same as the length in the normal direction, the intervals between the extension insertion holes can be increased, and therefore the strength of the second coupler can be increased. Moreover, by making the length longer in the normal direction, a large amount of inclination of the first coupler with respect to the second coupler can be obtained, therefore increasing the axial misalignment tolerance.

Aspect 16.

In any of Aspect 1 to Aspect 15, at least one of the first coupler (for example, the first coupling 161) and the second coupler (for example, the second coupling 162) is mounted on a corresponding one of the first rotary shaft (for example, the screw drive shaft 63) and the second rotary shaft (for example, the screw shaft 431b) swingably by a given angle with respect to the axial direction. The reinforcing ribs (for example, the reinforcing ribs 161e) extend from the respective extensions toward a center of rotation of the first coupler and are coupled at the center of rotation. The second coupler includes a rib insertion hole (for example, the rib insertion hole 162d) to which the reinforcing ribs are inserted toward the center of rotation, and extension insertion holes (for example, the claw insertion holes 162c) to which the extensions (for example, the drive claws 161c) are inserted and link to the rib insertion holes. $(D1-D4)/2 > X \sin \theta$ is satisfied, where "θ" represents a maximum inclination angle taken by either one of the first coupler and the second coupler inclinable with respect to the axial direction when the first coupler and the second coupler are coupled, "X" represents a length of each of the extensions in the axial direction, "D1" represents a diameter of a drive coupling circle that links respective centers of the extensions, and "D4" represents an inner diameter of the rib insertion hole.

Consequently, as described in the examples above, even when the first coupler and the second coupler are inclined by the maximum inclination angle, there is no chance that the leading end of the extensions is located at the rib insertion holes upon drive transmission. Therefore, even if there is the axial misalignment, the extensions can move smoothly in the extension insertion holes reliably, and occurrence of vibration can be prevented.

Aspect 17.

In any of Aspect 1 through Aspect 16, one coupler of the first coupler (for example, the first coupling 161) and the second coupler (for example, the second coupling 162) is a moving coupler (for example, the first coupling 161 in the above-described examples) that is mounted on a rotary shaft swingably by a given angle and movably in a given area with respect to the axial direction. The moving coupler includes a biasing member (for example, the coil spring 63c) and a bearing member (for example, the bearing pin 64d). The biasing member biases the moving coupler toward the other coupler of the first coupler and the second coupler when the moving coupler is moved in a direction separating from the other coupler. The bearing member receives a biasing force applied by the biasing member when the moving coupler is located at a drive transmitting position where the moving coupler transmits a drive force with the other coupler, so as to prevent the biasing force of the biasing member from acting on the moving coupler upon drive transmission.

Consequently, as described in the examples above, when the extensions (for example, the drive claws 161c) are out of phase with the extension insertion holes (for example, the claw insertion holes 162c) and the extensions do not enter the extension insertion holes successfully, the moving coupler moves in the axial direction to escape. Therefore, the coupling can be prevented from being damaged or broken.

Moreover, even if the moving coupler is inclined with respect to the axial direction due to the axial misalignment, and connected to the different coupler (for example, the second coupler in the above-described examples), a biasing force of the biasing member to stop the inclination of the moving coupler does not occur in the moving coupler. Consequently, the biasing force of the biasing member is prevented from warping or bending the second rotary shaft (for example, the screw shaft 431b) and the first rotary shaft (for example, the screw drive shaft 63), thereby preventing an axial reaction force from occurring.

Aspect 18.

In Aspect 17, the bearing member (for example, the bearing pin 64d) is either one of a spring pin and a parallel pin attached to the rotary shaft (for example, the screw drive shaft 63) to be located between the moving coupler and the biasing member (for example, the coil spring 63c) when the moving coupler (for example, the first coupling 161 in the above-described examples) is located at a drive transmitting position.

Consequently, as described in the examples above, compared with the configuration including the parallel pin as the bearing member, when the spring pin is employed as the bearing member, a reduction in cost of the image forming apparatus (for example, the image forming apparatus 100) can be achieved. By contrast, compared with the configuration including the spring pin as the bearing member, when the parallel pin is employed as the bearing member, the higher positional or axial precision can be obtained. Therefore, a clearance between the moving coupler and the bearing member can be a specified or given clearance, thereby inclining the moving coupler by a given angle.

Aspect 19.

In Aspect 17 or Aspect 18, the moving coupler (for example, the first coupling 161) includes an escape (for example, the bearing pin escape 161f). The escape is formed in the portion where the moving coupler disposed facing the bearing member (for example, the bearing pin 64d) such that the moving coupler does not hit the bearing member when the moving coupler is moved in a direction separating from the other coupler (for example, the second coupling 162 in the above-described examples).

Consequently, as described in the examples above, the moving coupler can be moved in the axial direction in a wider area than a clearance between the moving coupler and the bearing member without being stopped by the bearing member. Therefore, when the extensions (for example, the claw claws 161c) do not enter the extension insertion holes (for example, the claw insertion holes 162c) successfully, the moving coupler can move in the axial direction to escape to a position where an axial force or a force in the axial direction is not applied to the moving coupler, thereby preventing the moving coupling from being damaged or broken.

Aspect 20.

In any of Aspect 17 through Aspect 19, the moving coupler (for example, the first coupling 161 in the above-described examples) includes a mounting hole part (for example, the shaft insertion portion 161a) and an intermediate member (for example, the intermediate member 64e). The rotary shaft (for example, the screw drive shaft 63) is inserted to the mounting hole part. The mounting hole part has an inner diameter greater than an outer diameter of the rotary shaft. The intermediate member is arranged between the bearing member (for example, the bearing pin 64d) and the biasing member (for example, the coil spring 63c) and movable in the axial direction.

Consequently, as described in the examples above, the biasing member is prevented from entering between the mounting hole part and the rotary shaft. Moreover, when the moving coupler is moved in a direction separating from the different coupler (for example, the second coupling 162 in the above-described examples) and contacts the intermediate member, the intermediate member moves in a direction separating from the different coupler together with the moving coupler. Consequently, when the extensions (for example, the drive claws 161c) do not enter the extension insertion holes (for example, the claw insertion holes 162c) successfully, the moving coupler can be escaped to the position where a force in the axial direction is not applied to the moving coupler, thereby preventing the coupler from being damaged or broken.

Aspect 21.

In any of Aspect 1 to Aspect 16, one coupler of the first coupler (for example, the first coupling 161) and the second coupler (for example, the second coupling 162) is a moving coupler (for example, the first coupling 161 in the above-described examples) that is mounted on the rotary shaft swingably by a given angle and movably in a given area with respect to the axial direction. The moving coupler includes a mounting hole part (for example, the shaft insertion portion 161a), a biasing member (for example, the coil spring 63c), and an intermediate member (for example, the intermediate member 64e). The mounting hole part has an inner diameter greater than an outer diameter of the first rotary shaft (for example, the screw drive shaft 63 in the above-described examples) to which the first rotary shaft is inserted. The biasing member biases the moving coupler toward the other coupler (for example, the second coupling 162 in the above-described examples) of the first coupler and the second coupler when the moving coupler is moved in a direction separating from the other coupler. The intermediate member is arranged between the moving coupler and the biasing member and movable in the axial direction.

Consequently, as described in the example above with FIG. 23, the biasing member is prevented from entering between the mounting hole part and the rotary shaft. Moreover, when the moving coupler is moved in the direction separating from the other coupler and contacts the intermediate member, the intermediate member, together with the moving coupler, moves in the direction separating from the other coupler. Therefore, when the extensions (for example, the drive claws 161c) do not enter the extension insertion holes (for example, the claw insertion holes 162c) successfully, the moving coupler can be moved to the position where a force in the axial direction is not applied to the moving coupler, thereby preventing the coupler from being damaged or broken.

Aspect 22.

In Aspect 21, the drive transmitter (for example, the drive transmitter 50) further includes a drive transmitting member (for example, the pin 63b). The drive transmitting member extends from outside the rotary shaft (for example, the screw drive shaft 63 in the above-described examples) and is inserted to the moving coupler (for example, the first coupling 161 in the above-described examples) to transmit a drive force between the rotary shaft and the moving coupler. The intermediate member (for example, the intermediate member 64e) includes a contact portion (for example, the contact portion 64f). The contact portion is abutted against the drive transmitting member in the axial direction, so that a biasing force applied by the biasing member (for example, the coil spring 63c) does not act on the moving coupler.

Consequently, as described in the examples above with FIGS. 25A through 25C, even if the moving coupler is inclined due to the axial misalignment in the axial direction and is coupled with the other coupler (for example, the second coupling 162 in the above-described examples), a biasing force of the biasing member as to stop the inclination of the moving coupler is not generated. Therefore, the second rotary shaft (for example, the screw shaft 431b) and the first rotary shaft are prevented from warping under the biasing force of the biasing member, thereby preventing the axial reaction force from occurring.

Moreover, when compared with the configuration provided with the bearing member (for example, the bearing pin 64d), the number of parts can be reduced, thereby promoting and/or achieving a reduction in cost of the image forming apparatus (for example, the image forming apparatus 100). Further, the process to press and fit the bearing member to the rotary shaft (for example, the screw drive shaft 63) can be omitted. Therefore, the number of assembly manpower can be reduced, thereby promoting and/or achieving a reduction in manufacturing cost of the image forming apparatus.

Aspect 23.

In any of Aspect 20 through Aspect 22, a clearance between the intermediate member (for example, the intermediate member 64e) and the rotary shaft (for example, the screw drive shaft 63) on which the moving coupler (for example, the first coupling 161) is mounted is smaller than the diameter of a clearance between the mounting hole part (for example, the shaft insertion portion 161a) and the rotary shaft.

Consequently, when compared with a configuration in which the clearance between the intermediate member and the rotary shaft is greater than the clearance between the mounting hole part and the rotary shaft, the biasing member (for example, the coil spring 63c) can be prevented from entering the clearance between the mounting hole part and the rotary shaft.

Aspect 24.

In any of Aspect 20 through Aspect 23, the intermediate member (for example, the intermediate member 64e) is formed of resin and the moving coupler (for example, the first coupling 161 in the above-described examples) is made of metal.

Consequently, as described in the examples above, the strength of the moving coupler can be increased. Therefore, abnormal noise such as metallic sound can be prevented when the moving coupler contacts the intermediate member.

Aspect 25.

In Aspect 25, an image forming apparatus (for example, the image forming apparatus 100) includes an image forming device (for example, the process cartridges 40Y, 40M, 40C, and 40K) to form an image on a recording medium, and the drive transmitter (for example, the drive transmitter 50) according to any one of Aspect 1 through Aspect 24 to transmit a drive force to the image forming device.

Consequently, the space for arranging the coupling can be reduced, and therefore the image forming apparatus can be reduced in size.

The above-described embodiments are illustrative and do not limit this disclosure. Thus, numerous additional modifications and variations are possible in light of the above teachings. For example, elements at least one of features of different illustrative and exemplary embodiments herein may be combined with each other at least one of substituted for each other within the scope of this disclosure and appended claims. Further, features of components of the embodiments, such as the number, the position, and the shape are not limited the embodiments and thus may be preferably set. It is therefore to be understood that within the scope of the appended claims, the disclosure of this disclosure may be practiced otherwise than as specifically described herein.

What is claimed is:

1. A drive transmitter comprising:
   a first coupler mounted on an axial end of a first rotary shaft and provided with extensions, which extend in an axial direction thereof and are arranged at intervals in a rotation direction thereof;
   a second coupler mounted on an axial end of a second rotary shaft and provided with contact parts to which respective extensions contact between the first rotary shaft and the second rotary shaft upon drive transmission; and
   reinforcing ribs provided to the respective extensions and reinforcing the respective extensions, wherein a rotation center part of the reinforcing ribs projects closer to the second coupler than the extensions, wherein a top surface of each of the extensions and a top surface of each of the reinforcing ribs on a side of the second coupler tilt at a substantially equal angle to each other, relative to a top surface in a longitudinal direction of each of the extensions.

2. The drive transmitter according to claim 1, wherein the reinforcing ribs of the respective extensions are coupled with each other.

3. The drive transmitter according to claim 1, wherein the reinforcing ribs extend from the respective extensions toward a center of rotation of the first coupler and are coupled at the center of rotation.

4. The drive transmitter according to claim 1, wherein each coupling portion provided between the reinforcing ribs and the respective extensions is formed in an R shape.

5. The drive transmitter according to claim 4, wherein an end of the R shape on a side of the extensions is located closer to a center of rotation of the first coupler than a drive coupling circle that links respective centers of the extensions.

6. The drive transmitter according to claim 1,
wherein at least one of the first coupler and the second coupler is mounted on a corresponding one of the first rotary shaft and the second rotary shaft swingably by a given angle with respect to the axial direction thereof,
wherein each surface of the extensions contacting the contact parts upon drive transmission and the contact parts are formed in an arc shape.

7. The drive transmitter according to claim 1, wherein the first coupler includes at least three extensions.

8. The drive transmitter according to claim 1,
wherein the second coupler includes extension insertion holes to which the extensions are inserted and a rib insertion hole to which the reinforcing ribs are inserted,
wherein the reinforcing ribs extend from the respective extensions toward a center of rotation of the first coupler and are coupled at the center of rotation.

9. The drive transmitter according to claim 8,
wherein the first coupler is mounted on the first rotary shaft swingably by a given angle with respect to the axial direction thereof,
wherein, when the first coupler inclines in the axial direction under the own weight thereof, a leading end of the rotation center part of the reinforcing ribs is located closer to the second coupler than the leading ends of the extensions.

10. The drive transmitter according to claim 1, wherein the second coupler is formed of resin and the first coupler is formed of either one of metal and resin having a flexural modulus greater than the second coupler.

11. The drive transmitter according to claim 1,
wherein at least one of the first coupler and the second coupler is mounted on a corresponding one of the first rotary shaft and the second rotary shaft swingably by a given angle with respect to the axial direction thereof,
wherein the first coupler includes projections at a leading end of each of the extensions, each of the projections projecting in the rotation direction and contacting a corresponding one of the contact parts of the second coupler.

12. The drive transmitter according to claim 1,
wherein the reinforcing ribs extend from the respective extensions toward a center of rotation of the first coupler and are coupled at the center of rotation,
wherein, when viewing the first coupler in the axial direction, based on a line segment connecting a center of each of the extensions and the center of rotation of the first coupler, a thickness of each of the reinforcing ribs on an upstream side in the rotation direction of the reinforcing ribs upon drive transmission is greater than a thickness of the reinforcing ribs on a downstream side in the rotation direction thereof.

13. The drive transmitter according to claim 1,
wherein at least one of the first coupler and the second coupler is mounted on a corresponding one of the first rotary shaft and the second rotary shaft swingably by a given angle with respect to the axial direction thereof,
wherein the second coupler includes extension insertion holes to which the extensions are inserted,
wherein a length of each of the extension insertion holes in the rotation direction is shorter than a length of the extension insertion holes in a normal direction.

14. The drive transmitter according to claim 1,
wherein at least one of the first coupler and the second coupler is mounted on a corresponding one of the first rotary shaft and the second rotary shaft swingably by a given angle with respect to the axial direction thereof,
wherein the reinforcing ribs extend from the respective extensions toward a center of rotation of the first coupler and are coupled at the center of rotation,
wherein the second coupler includes a rib insertion hole to which the reinforcing ribs are inserted toward the center of rotation, and extension insertion holes to which the extensions are inserted and linking to the rib insertion hole,
wherein $(D1-D4)/2 > X \sin \theta$ is satisfied, where "$\theta$" represents a maximum inclination angle taken by either one of the first coupler and the second coupler inclinable with respect to the axial direction when the first coupler and the second coupler are coupled, "X" represents a length of each of the extensions in the axial direction, "D1" represents a diameter of a drive coupling circle that links respective centers of the extensions, and "D4" represents an inner diameter of the rib insertion hole.

15. The drive transmitter according to claim 1,
wherein one coupler of the first coupler and the second coupler is a moving coupler that is mounted on the first rotary shaft swingably by a given angle and movably in a given area with respect to the axial direction,
wherein the moving coupler includes
a biasing member being mounted on the first rotary shaft and configured to apply a biasing force and to bias the moving coupler toward the other coupler of the first couple and the second coupler when the moving coupler is moved in a direction separating from the other coupler; and
a bearing member configured to contact the biasing member and being mounted on the first rotary shaft and to prevent the biasing member from directly contacting the moving coupler before the moving coupler starts to move from the other coupler of the first coupler and the second coupler.

16. The drive transmitter according to claim 15,
wherein the moving coupler further includes
a mounting hole part to which the first rotary shaft is inserted, the mounting hole part having an inner diameter greater than an outer diameter of the first rotary shaft; and
an intermediate member arranged between the bearing member and the biasing member and movable in the axial direction.

17. The drive transmitter according to claim 1,
wherein one coupler of the first coupler and the second coupler is a moving coupler that is mounted on the first rotary shaft swingably by a given angle and movably in a given area with respect to the axial direction,
wherein the moving coupler includes
a mounting hole part having an inner diameter greater than an outer diameter of the first rotary shaft to which the first rotary shaft is inserted;
a biasing member to bias the moving coupler toward the other coupler of the first coupler and the second coupler when the moving coupler is moved in a direction separating from the other coupler; and an intermediate member arranged between the moving coupler and the biasing member and movable in the axial direction.

18. An image forming apparatus comprising:

an image forming device to form an image on a recording medium; and the drive transmitter according to claim 1 to transmit a drive force to the image forming device.

19. The drive transmitter according to claim 1, wherein both the extensions of the first coupler and the rotation center part of the reinforcing ribs have a cylindrical shape, and wherein an axial length of the rotation center part in a direction of the first rotary shaft is greater than an axial length of the extensions in the direction of the first rotary shaft.

20. The drive transmitter according to claim 1, wherein each of the extensions and the rotation center are coupled by the reinforcing ribs.

* * * * *